US009138778B2

(12) United States Patent
Kato et al.

(10) Patent No.: US 9,138,778 B2
(45) Date of Patent: Sep. 22, 2015

(54) METHOD FOR FORMATION OF MULTI-LAYERED COATING FILM, AND COATED ARTICLE

(75) Inventors: Atsuya Kato, Hiratsuka (JP); Akinori Nagai, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 487 days.

(21) Appl. No.: 13/640,794

(22) PCT Filed: Apr. 14, 2011

(86) PCT No.: PCT/JP2011/059307
§ 371 (c)(1),
(2), (4) Date: Oct. 12, 2012

(87) PCT Pub. No.: WO2011/129413
PCT Pub. Date: Oct. 20, 2011

(65) Prior Publication Data
US 2013/0029159 A1 Jan. 31, 2013

(30) Foreign Application Priority Data

Apr. 14, 2010 (JP) .................................. 2010-093094
Apr. 14, 2010 (JP) .................................. 2010-093095
Apr. 14, 2010 (JP) .................................. 2010-093096

(51) Int. Cl.
*B05D 7/24* (2006.01)
*B05D 1/36* (2006.01)
*C08F 290/06* (2006.01)
*C08F 299/08* (2006.01)
*C09D 7/12* (2006.01)
*C09D 183/04* (2006.01)
*B05D 7/00* (2006.01)
*C08F 299/06* (2006.01)
*B05D 3/02* (2006.01)
*B05D 3/06* (2006.01)

(52) U.S. Cl.
CPC .............. *B05D 7/544* (2013.01); *B05D 3/0209* (2013.01); *B05D 7/546* (2013.01); *C08F 299/06* (2013.01); *C09D 183/04* (2013.01); *B05D 3/0254* (2013.01); *B05D 3/067* (2013.01); *Y10T 428/31663* (2015.04)

(58) Field of Classification Search
CPC .... B05D 3/0209; B05D 3/0254; B05D 3/067; B05D 7/544; B05D 7/546
See application file for complete search history.

(56) References Cited

U.S. PATENT DOCUMENTS

| 5,233,006 A * | 8/1993 | Wolter et al. .................. 528/32 |
| 5,260,361 A | 11/1993 | Fukushima et al. |
| 2011/0196059 A1 | 8/2011 | Nagai et al. |

FOREIGN PATENT DOCUMENTS

| JP | 1-098609 | 4/1989 |
| JP | 5-230397 | 9/1993 |
| JP | 6-128502 | 5/1994 |
| JP | 6-200034 | 7/1994 |
| JP | 7-126396 | 5/1995 |
| JP | 8-12899 | 1/1996 |
| JP | 2003-268323 | 9/2003 |
| JP | 2006-263616 | 10/2006 |
| JP | 2009-160572 | 7/2009 |
| JP | 2009-166029 | 7/2009 |
| JP | 2009-206197 | 9/2009 |
| WO | 2009/075369 | 6/2009 |
| WO | 2010/044321 | 4/2010 |
| WO | WO 2010044321 A1 * | 4/2010 |
| WO | 2010/067684 | 6/2010 |
| WO | WO 2010067684 A1 * | 6/2010 |

OTHER PUBLICATIONS

International Search Report issued Jul. 19, 2011 in International (PCT) Application No. PCT/JP2011/059307.

* cited by examiner

*Primary Examiner* — Dah-Wei D Yuan
*Assistant Examiner* — Kristen A Dagenais
(74) *Attorney, Agent, or Firm* — Wenderoth, Lind & Ponack, L.L.P.

(57) ABSTRACT

The present invention provides a method of forming a multi-layered coating film including the steps of (1) forming an undercoating film using an undercoating composition (I), and (2) forming a top coating film on the undercoating film after the formation of the undercoating film, the top coating film being formed using an active energy ray-curable top coating composition (II) containing a silsesquioxane compound (a) and a photoinitiator (b), the silsesquioxane compound (a) containing one or more organic groups each directly bonded to a silicone atom, and at least one of the organic groups having one or more urethane bonds and one (meth)acryloyloxy group.

17 Claims, No Drawings

METHOD FOR FORMATION OF MULTI-LAYERED COATING FILM, AND COATED ARTICLE

CROSS-REFERENCE TO RELATED APPLICATIONS

This application claims priority to JP No. 2010-093094, JP No. 2010-093095, and JP No. 2010-093096, all filed on Apr. 14, 2010 (the entire contents of which are incorporated by reference herein).

TECHNICAL FIELD

The present invention relates to a method for forming a multi-layered coating film capable of forming a multi-layered coating film having excellent adhesion to a substrate, particularly, plastic material, and extremely excellent weather resistance and scratch resistance; and a coated article having the multi-layered coating film.

BACKGROUND ART

Since plastic material of polymethyl methacrylate resin, polystyrene resin, polycarbonate resin, etc., has excellent impact resistance and transparency, and is light and easily processed, it is used in skylight material of buildings, windows for vehicles, lamp lenses, instrument covers, and the like as a material substitute for glass. However, since plastic material has poor surface properties in view of scratch resistance, chemical resistance, and weather resistance, compared to glass, the surface properties of the plastic material are modified. A method of coating heat-curable coating compositions such as polyorganosiloxane-based compositions and melamine-based compositions, and a method of coating polyfunctional acrylate-based active energy ray-curable coating compositions have been proposed as methods of modifying the surface properties of plastic material.

Regarding these methods, Patent Literature 1 and 2 disclose the inventions of coating compositions obtained by mixing poly(meth)acrylate of mono- or poly-pentaerythritol, urethane(meth)acrylate having at least two (meth)acryloyl groups per molecule, and poly[(meth)acryloyloxy alkyl](iso)cyanurate in a specific proportion. These coating compositions have excellent scratch resistance and weather resistance.

On the other hand, a method of adding inorganic material or inorganic-organic hybrid material to a coating composition is known as a method of improving the scratch resistance and weather resistance of a general coating composition. For example, Patent Literature 3 and 4 discloses a layered silicone polymer having a phyllosilicate mineral layer structure comprising a 2:1- or 1:1-type laminate having a sheet of tetrahedrons with a central atom of Si and a sheet of octahedrons with a central atom of a metal, and the layered silicone polymer having an organic group being covalently bonded to at least part of the silicone. Patent Literature 5 discloses a coating composition in which the layered silicone polymer of Patent Literature 3 or 4 is used as a filler.

Recently, in accordance with expansion of the outdoor application of plastic material, further improvement in the surface properties (scratch resistance and weather resistance) of plastic material is desired. However, the coating composition disclosed in Patent Literature 5 cannot form a cured coating film having excellent scratch resistance, weather resistance, and adhesion to a plastic substrate, all satisfying the aforementioned requirements. Further, even when a layered silicone polymer disclosed in Patent Literature 3 or 4 is added to a coating composition disclosed in Patent Literature 1 or 2, a coating composition capable of forming a cured coating film having excellent scratch resistance, weather resistance, and adhesion to a plastic substrate, all satisfying the aforementioned requirements, cannot be obtained.

To solve the problems of one-coat coating film obtained by using the aforementioned coating composition, Patent Literature 6 suggests a multi-layered coating film method using a specific undercoating composition. However, the method of Patent Literature 6 has problems such that the top coating composition mainly comprises an organic component, and the weather resistance and scratch resistance are insufficient compared to compositions in which inorganic material or inorganic-organic hybrid material disclosed in Patent Literature 3 to 5 is mixed.

CITATION LIST

Patent Literature

PTL 1: Japanese Unexamined Patent Publication No. H5-230397
PTL 2: Japanese Unexamined Patent Publication No. H6-128502
PTL 3: Japanese Unexamined Patent Publication No. H6-200034
PTL 4: Japanese Unexamined Patent Publication No. H7-126396
PTL 5: Japanese Unexamined Patent Publication No. H8-12899
PTL 6: Japanese Unexamined Patent Publication No. 2006-263616

SUMMARY OF INVENTION

Technical Problem

The present invention was made in light of the aforementioned circumstances. An object of the present invention is to provide a multi-layered coating film production method that is capable of forming a multi-layered coating film having excellent adhesion to plastic material as well as extremely high weather resistance and scratch resistance, and a coated article having the multi-layered coating film.

Solution to Problem

The present inventors conducted extensive research to solve the aforementioned problems. As a result, they found that the use of an active energy ray-curable top coating composition containing a specific silsesquioxane compound and photoinitiator can solve the above object, and accomplish the present invention.

Specifically, the present invention relates to the following:
1. A method of forming a multi-layered coating film comprising the steps of
(1) forming an undercoating film using an undercoating composition (I), and
(2) forming a top coating film on the undercoating film after the formation of the undercoating film, the top coating film being formed using an active energy ray-curable top coating composition (II) comprising a silsesquioxane compound (a) and a photoinitiator (b),
the silsesquioxane compound (a) comprising one or more organic groups each directly bonded to a silicone atom, and at least one of the organic groups having one or more urethane bonds and one (meth)acryloyloxy group.

2. The method according to Item 1, wherein the organic group having one or more urethane bonds and one (meth)acryloyloxy group in the component (a) is an organic group represented by the following formula (A)

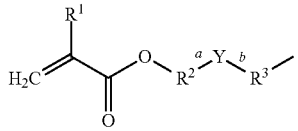 (A)

wherein $R^1$ represents hydrogen or methyl,
$R^2$ represents $C_{1-10}$ divalent hydrocarbon,
$R^3$ represents $C_{1-10}$ divalent hydrocarbon, and
Y represents

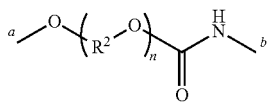

wherein $R^2$ is the same as above, and n represents an integer of 0 to 9,

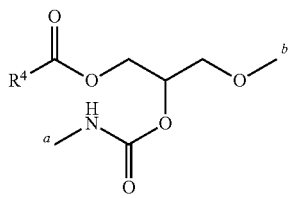

wherein $R^4$ represents substituted or unsubstituted $C_{1-6}$ monovalent hydrocarbon, or

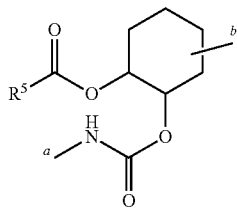

wherein $R^5$ represents substituted or unsubstituted $C_{1-6}$ monovalent hydrocarbon.

3. The method according to Item 1 or 2, wherein the active energy ray-curable top coating composition (II) comprises a photoinitiator (b) in an amount of 1 to 20 parts by mass per 100 parts by mass of nonvolatile matter of a silsesquioxane compound (a).

4. The method according to any one of Items 1 to 3, wherein the active energy ray-curable top coating composition (II) further comprises a polymerizable unsaturated compound (c).

5. The method according to Item 4, wherein the active energy ray-curable top coating composition (II) comprises a polymerizable unsaturated compound (C) in cn amount of 0.1 to 1,000 parts by mass per 100 parts by mass of nonvolatile matter of a silsesquioxane compound (a).

6. The method according to any one of Items 1 to 5, wherein the undercoating composition (I) is an active energy ray-curable undercoating composition (Ia) comprising a photoinitiator, a UV absorber, a light stabilizer, and a polymerizable unsaturated compound comprising urethane (meth) acrylate having two or more (meth)acryloyl groups per molecule.

7. The method according to Item 6, wherein the active energy ray-curable undercoating composition (Ia) comprises a polymerizable unsaturated compound in an amount of 30 to 97 parts by mass per 100 parts by mass of nonvolatile matter of the coating composition, a photoinitiator in an amount of 0.1 to 10 parts by mass per 100 parts by mass of nonvolatile matter of the polymerizable unsaturated compound, and a UV absorber in an amount of 0.5 to 20 parts by mass per 100 parts by mass of nonvolatile matter of the polymerizable unsaturated compound.

8. The method according to Item 6 or 7, wherein the polymerizable unsaturated compound comprises urethane(meth) acrylate in an amount of 30 to 100 parts by mass per 100 parts by mass of nonvolatile matter of the polymerizable unsaturated compound.

9. The method according to any one of Items 1 to 5, wherein the undercoating composition (I) is photo- and heat-curable undercoating composition (Ib) comprising a polymerizable unsaturated compound, a hydroxy-containing resin, a photoinitiator, a UV absorber, and a light stabilizer.

10. The method according to Item 9, wherein the photo- and heat-curable undercoating composition (Ib) comprises a polymerizable unsaturated compound in an amount of 10 to 80 parts by mass per 100 parts by mass of nonvolatile matter of the coating composition, a hydroxy-containing resin in an amount of 10 to 80 parts by mass per 100 parts by mass of nonvolatile matter of the coating composition, a photoinitiator in an amount of 1 to 20 parts by mass per 100 parts by mass of nonvolatile matter of the polymerizable unsaturated compound, a UV absorber in an amount of 0.5 to 20 parts by mass per 100 parts by mass of nonvolatile matter of the coating composition, and a light stabilizer in an amount of 0.1 to 10 parts by mass per 100 parts by mass of nonvolatile matter of the coating composition.

11. The method according to Item 9 or 10, wherein the polymerizable unsaturated compound comprises an isocyanate-containing compound.

12. The method according to Item 11, wherein the isocyanate-containing compound is a radical polymerizable unsaturated group-containing compound having an isocyanate equivalent amount of 300 to 3,800.

13. The method according to any one of Items 1 to 5, wherein the undercoating composition (I) is room temperature- or heat-curable undercoating composition (Ic) comprising an acrylic resin, a UV absorber, and a light stabilizer.

14. The method according to Item 13, wherein the room temperature- and heat-curable undercoating composition (Ic) comprises an acrylic resin in an amount of 50 to 99.4 parts by mass per 100 parts by mass of nonvolatile matter of the coating composition, a UV absorber in an amount of 0.5 to 20 parts by mass per 100 parts by mass of nonvolatile matter of the coating composition, and a light stabilizer in an amount of 0.1 to 10 parts by mass per 100 parts by mass of nonvolatile matter of the coating composition.

15. The method according to any one of Items 1 to 5, wherein the undercoating composition (I) is room temperature- or heat-curable undercoating composition (Ic)' comprising an acrylic resin obtained by copolymerizing a polymerizable unsaturated monomer mixture comprising a UV-absorbing polymerizable unsaturated monomer and/or a UV-stable polymerizable unsaturated monomer.

16. The method according to Item 15, wherein the room temperature- or heat-curable undercoating composition (Ic)' comprises an acrylic resin in an amount of 50 to 100 parts by mass per 100 parts by mass of nonvolatile matter of the coating composition.

17. A coated article having a multi-layered coating film formed by the method according to any one of Items 1 to 16.

Advantageous Effects of Invention

According to the present invention, by using a specific active energy ray-curable top coating composition, a multi-layered coating film having excellent scratch resistance, weather resistance, and adhesion to a substrate can be obtained. Further, a coated article having the multi-layered coating film can be obtained.

DESCRIPTION OF EMBODIMENTS (I) Undercoating Composition

The undercoating composition (I) used in the present invention is not particularly limited as long as it can be used as an undercoating composition, and conventionally known undercoating compositions can be used. Preferable examples of the undercoating composition (I) include an active energy ray-curable undercoating composition (Ia), a light- and heat-curable undercoating composition (Ib), a room temperature- or heat-curable undercoating composition (Ic), and the like.

(Ia) Active Energy Ray-Curable Undercoating Composition

The active energy ray-curable undercoating composition (Ia) is not particularly limited as long as it can be cured by an active energy ray, and conventionally known active energy ray-curable undercoating compositions can be used. From the viewpoint of the weather resistance of the multi-layered coating film obtained when a substrate is plastic, an active energy ray-curable coating composition containing a polymerizable unsaturated compound, photoinitiator, UV absorber, and light stabilizer can be preferably used.

The polymerizable unsaturated compound is not particularly limited, as long as it is a compound having at least one polymerizable unsaturated double bond in its chemical structure.

Examples of the polymerizable unsaturated compound include esterified products of a monohydric alcohol and (meth)acrylic acid, and the like. Specific examples thereof include methyl(meth)acrylate, ethyl(meth)acrylate, n-propyl (meth)acrylate, isopropyl(meth)acrylate, n-butyl(meth)acrylate, isobutyl(meth)acrylate, t-butyl(meth)acrylate, neopentyl(meth)acrylate, cyclohexyl(meth)acrylate, tetrahydrofurfuryl(meth)acrylate, isobornyl(meth)acrylate, phenyl(meth)acrylate, benzyl(meth)acrylate, N-acryloyloxyethyl hexahydrophthalimide, and the like. Other examples of the polymerizable unsaturated compound include esterified products of a polyhydric alcohol and (meth)acrylic acid. Specific examples thereof include ethylene glycol di(meth)acrylate, diethylene glycol di(meth)acrylate, triethylene glycol di(meth)acrylate, tetraethylene glycol di(meth)acrylate, 1,3-butanediol di(meth)acrylate, 1,4-butanediol di(meth)acrylate, 1,9-nonanediol di(meth)acrylate, glycerin di(meth)acrylate, trimethylolpropane di(meth)acrylate, pentaerythritol di(meth)acrylate, neopentyl glycol di(meth)acrylate, 1,6-hexanediol di(meth)acrylate, pentaerythritol di(meth)acrylate, bisphenol A ethylene oxide-modified di(meth)acrylate, and like di(meth)acrylate compounds; glycerin tri(meth)acrylate, trimethylolpropane tri(meth)acrylate, trimethylolpropane propylene oxide-modified tri(meth)acrylate, trimethylolpropane ethylene oxide-modified tri(meth)acrylate, pentaerythritol tri(meth)acrylate, tris(2-acryloyloxyethyl) isocyanurate, tris(2-acryloyloxypropyl)isocyanurate, ε-caprolactone-modified tris (acryloxyethyl)isocyanurate, a reaction product of equimolar hydroxyalkyl(meth)acrylate and isocyanurate ring adduct of 1,6-hexamethylene diisocyanate, a reaction product of equimolar hydroxyalkyl (meth)acrylate and isocyanurate ring adduct of hexamethylene diisocyanate having amino oxadiazine dione, and like tri(meth)acrylate compounds; pentaerythritol tetra(meth)acrylate, and like tetra(meth)acrylate compounds; and dipentaerythritol penta(meth)acrylate, dipentaerythritol hexa(meth)acrylate, etc. Examples thereof further include urethane (meth)acrylate, epoxy (meth)acrylate, polyester (meth)acrylate, unsaturated group-containing acrylic resin, and the like. Urethane (meth) acrylate can be obtained by, for example, using a polyisocyanate compound, hydroxyalkyl(meth)acrylate, and a polyol compound as starting materials, and carrying out a reaction in such a manner that hydroxy is used in an equimolar or excess amount based on the amount of isocyanate. The polymerizable unsaturated compounds can be used singly, or in a combination of two or more.

From the viewpoint of the weather resistance of the obtained coating film, the amount of the polymerizable unsaturated compound in the active energy ray-curable undercoating composition (Ia) is suitably 30 to 97 parts by mass, and preferably 60 to 97 parts by mass, per 100 parts by mass of the nonvolatile matter of the coating composition.

It is particularly preferable that the polymerizable unsaturated compound contained in the active energy ray-curable undercoating composition (Ia) include, as a part of the component, urethane(meth)acrylate, from the viewpoint of the weather resistance (adhesion to a substrate and cracking) of the obtained multi-layered coating film. The urethane (meth) acrylate includes two or more (meth)acryloyl groups per molecule. Urethane (meth)acrylate can be used singly, or as a mixture of two or more.

Examples of commercially available products of the urethane(meth)acrylate include CN9001 (tradename, urethane acrylate produced by Sartomer Co., Ltd.), Ebecryl 1290k (tradename, urethane acrylate produced by Daicel Cytec Company Ltd.), UN952 (tradename, polyfunctional urethane acrylate produced by Negami Chemical Industrial Co., Ltd.), etc.

When the polymerizable unsaturated compound contains the urethane(meth)acrylate, it is preferable that the urethane (meth)acrylate be contained in an amount of 30 to 100 parts by mass, and preferably 50 to 100 parts by mass, per 100 parts by mass of the nonvolatile matter of the polymerizable unsaturated compound.

The polymerizable unsaturated compound may contain an unsaturated group-containing acrylic resin as a part of the component.

The unsaturated group-containing acrylic resin is an acrylic resin containing two or more radical polymerizable unsaturated groups per molecule, and as a method of introducing the polymerizable unsaturated group, conventionally known methods can be used without limitation. For example, the unsaturated group-containing acrylic resin can be obtained by a method of reacting a carboxy-containing acrylic resin with glycidyl(meth)acrylate, a method of reacting a hydroxy-containing acrylic resin with maleic anhydride or itaconic acid anhydride, a method of reacting isocyanatoethyl(meth)acrylate, a method of reacting an isocyanate-containing acrylic resin with 2-hydroxyethyl (meth)acrylate, etc., a method of reacting a reaction product of equimolar diisocyanate compound and 2-hydroxyethyl (meth)acrylate with a hydroxy-containing acryl resin.

The weight average molecular weight of the unsaturated group-containing acrylic resin is not particularly limited, and it is preferably 5,000 to 200,000, and more preferably 5,000 to 100,000.

In the present specification, the weight average molecular weight is determined by converting the weight average molecular weight measured by gel permeation chromatograph ("HLC8120GPC," produced by Tosoh Corporation), based on the weight average molecular weight of polystyrene. Four columns, i.e., "TSK-gel G4000 HxL," "TSK-gel G3000 HxL," "TSK-gel G2500 HxL," and "TSKgel G2000 HxL" (tradenames, all produced by Tosoh Corporation), and the following conditions were used. Mobile phase: tetrahydrofuran, measurement temperature: 40° C., flow rate: 1 ml/min., and detector: RI.

It is preferable that the unsaturated group-containing acrylic resin contain a UV-absorbing functional group or a UV-stable functional group to improve the weather resistance of the coating film. As a method for introducing such functional groups, a method of using as a copolymerization component of an acrylic resin, a UV-absorbing functional group-containing polymerizable monomer that contains benzophenone or benzotriazole, or a UV-stable functional group-containing polymerizable unsaturated monomer that contains piperidine. When such unsaturated group-containing acrylic resins that include a UV-absorbing functional group or a UV-stable functional group are used, the active energy ray-curable undercoating composition does not need to contain a UV absorber or a light stabilizer, which are mentioned later.

When the polymerizable unsaturated compound contains an unsaturated group-containing acrylic resin, from the viewpoint of the weather resistance (adhesion to a substrate and cracking) of the obtained multi-layered coating film, the polymerizable unsaturated compound contains an unsaturated group-containing acrylic resin in an amount of 60 parts by mass or less, and preferably 10 to 50 parts by mass or less, per 100 parts by mass of the nonvolatile matter thereof.

The photoinitiator is not particularly limited, as long as it absorbs an active energy ray and generates radicals.

Examples of the photoinitiator include benzyl, diacetyl, and like α-diketone compounds; benzoin and like acyloin compounds; benzoin methyl ether, benzoin ethyl ether, benzoin isopropyl ether, and like acyloin ether compounds; thioxanthone, 2,4-diethylthioxanthone, 2-isopropylthioxanthone, thioxanthone-4-sulfonic acid, and like thioxanthone compounds; benzophenone, 4,4'-bis(dimethylamino)benzophenone, 4,4'-bis(diethylamino)benzophenone, and like benzophenone compounds; Michler's ketone compounds; acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl[4-(methylthio)phenyl]-2-morpholino-1-propanone, 2-benzyl-2-dimethylamino-1-(4-morpholinophenyl)-butan-1-one, α-isohydroxy isobutylphenone, α,α'-dichloro-4-phenoxyacetophenone, 1-hydroxy-cyclohexyl-phenyl-ketone, and like acetophenone compounds; 2,4,6-trimethylbenzoyldiphenylphosphine oxide, bis(acyl)phosphine oxide, and like acylphosphine oxide compounds; anthraquinone, 1,4-naphthoquinone, and like quinones; phenacyl chloride, trihalomethylphenylsulfone, tris(trihalomethyl)-s-triazine, and like halogenated compounds; di-t-butyl peroxide, and like peroxide compounds; etc. These may be used singly, or in a combination of two or more.

Examples of commercially available photoinitiators include Irgacure 184, Irgacure 127, Irgacure 261, Irgacure 500, Irgacure 651, Irgacure 819, Irgacure 907, and Irgacure CGI 1700 (trade names, produced by BASF); Darocur 1173, Darocur 1116, Darocur 2959, Darocur 1664, Darocur 4043 (trade names, produced by Merck Japan Ltd.); Kayacure-MBP, Kayacure-DETX-S, Kayacure-DMBI, Kayacure-EPA, Kayacure-OA (trade names, produced by Nippon Kayaku Co., Ltd.); Vicure 10, Vicure 55 (trade names, produced by Stauffer Co., Ltd.); Trigonal P1 (trade name, produced by Akzo Co., Ltd.); Sandoray 1000 (trade name, produced by Sandoz Co., Ltd.); Deap (trade name, produced by Apjohn Co., Ltd.); Quantacure PDO, Quantacure ITX, Quantacure EPD (trade names, produced by Ward Blenkinsop Co., Ltd.); Esacure KIP 150, Esacure ONE (trade names, produced by Lamberti S.p.A.); Lucirin TPO; etc.

From the viewpoint of photocurability, the photoinitiator preferably contains a mixture of one or at least two compounds selected from thioxanthone compounds, acetophenone compounds, and acyl phosphine oxide compounds. Of these, a mixture of acetophenone compound and acyl phosphine oxide compound is particularly preferable.

The amount of the photoinitiator is not particularly limited, and is generally about 0.1 to 10 parts by mass, preferably 2 to 8 parts by mass, per 100 parts by mass of the nonvolatile matter of the polymerizable unsaturated compound.

By absorbing incident light and transforming light energy into a harmless form like heat, the UV absorber has an effect of inhibiting the attainment of the start of the deterioration of the coated film.

As the UV absorber, conventionally known UV absorbers can be used. For example, benzotriazole compounds, triazine compounds, salicylic acid derivatives, benzophenone compounds, etc., can be used.

Examples of the benzotriazole compound used as a UV absorber include 2-(2'-hydroxy-5'-methylphenyl)benzotriazole, 2-(2'-hydroxy-5'-t-buthylphenyl)benzotriazole, 2-(2'-hydroxy-3',5'-di-t-buthylphenyl)benzotriazole, 2-(2'-hydroxy-3'-t-butyl-5'-methylphenyl)-5-chlorobenzo triazole, 2-(2'-hydroxy-3',5'-di-t-buthylphenyl)-5-chlorobenzo triazole, 2-(2'-hydroxy-3',5'-di-t-amyl phenyl)benzotriazole, 2-(2'-hydroxy-4'-octoxy phenyl)benzotriazole, 2-{2'-hydroxy-3'-(3",4",5",6"-tetrahydro phthalimidomethyl)-5'-methylphenyl}benzotriazole, and the like.

Examples of the triazine compound used as a UV absorber include 2,4-bis(2,4-dimethylphenyl)-6-(2-hydroxy-4-isooctyloxyphenyl)-1,3,5-triazine, 2-[4((2-hydroxy-3-dodecyloxypropyl)-oxy)-2-hydroxyphenyl]-4,6-bis(2,4-dimethylphenyl)-1,3,5-triazine, 2-[4-(2-hydroxy-3-tridecyloxypropyl)-oxy)-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, and the like.

Examples of a salicylic acid derivative that can be used as a UV absorber include phenyl salicylate, p-octylphenyl salicylate, 4-tert-buthylphenylsalicylate, etc.

Examples of the benzophenone compound that can be used as a UV absorber include 4-dihydroxybenzophenone, 2-hydroxy-4-methoxybenzophenone, 2,2'-dihydroxy-4-methoxybenzophenone, 2-hydroxy-4-methoxy-2'-carboxy benzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, and the like. Examples of the UV absorber include known polymerizable UV absorbers such as 2-(2'-hydroxy-5'-methacryloiloxy-ethyl phenyl)-2H-benzotriazole, 2,2'-dihydroxy-4(3-metacryloxy-2-hydroxypropoxy) benzophenone, and the like.

Examples of commercially available products of the UV absorber include TINUVIN 900, TINUVIN 928, TINUVIN 348-2, TINUVIN479, TINUVIN 405 (trade name, produced by BASF), RUVA-93 (trade name, produced by Otsuka Chemical Co., Ltd.), etc.

The amount of the UV absorber is not particularly limited. The amount is generally 1 to 20 parts by mass and preferably 2 to 15 parts by mass, per 100 parts by mass of the nonvolatile matter of the polymerizable unsaturated compound.

On the other hand, the light stabilizer can be used as a radical chain inhibitor that catches an active radical type generated in the deterioration process of the coating film, and examples thereof include hindered amine compounds, etc.

Hindered piperidine compounds are examples of light stabilizers that exhibit an excellent light stabilization effect. Examples of the hindered piperidine compound include bis(1,2,2,6,6-pentamethyl-4-piperidyl)sebacate, bis(2,2,6,6-tetramethyl-4-piperidinyl)sebacate, bis(N-methyl-2,2,6,6-tetramethyl-4-piperidinyl) sebacate, 4-benzoyloxy-2,2',6,6'-tetramethylpiperidine, bis(1,2,2,6,6-pentamethyl-4-piperidyl) {[3,5-bis(1,1-dimethylethyl)-4-hydroxyphenyl]methyl}butyl malonate, and other monomer-type compounds; poly{[6-(1,1,3,3-tetramethylbutyl)imino-1,3,5-triazine-2,4-diyl)][(2,2,6,6-tetramethyl-4-piperidyl)imino]hexamethylene[(2,2,6,6-tetramethyl-4-piperidyl)iminol]}, and other oligomer-type compounds; polyester compounds of 4-hydroxy-2,2,6,6-tetramethyl-1-piperidine ethanol and succinic acid, and other polyester binding-type compounds; and the like. As a light stabilizer, known polymerizable light stabilizers can be used.

Examples of commercially available products of the light stabilizer include TINUVIN 123, TINUVIN 152, and TINUVIN 292 (trade name, produced by BASF A.G.), HOSTAVIN 3058 (trade name, produced by Clariant), Adeka Stub LA-82 (trade name, produced by Adeka Corporation), and the like.

The amount of the light stabilizer is not particularly limited, and is generally 0.1 to 10 parts by mass, preferably 0.5 to 5 parts by mass per 100 parts by mass of the nonvolatile matter of the polymerizable unsaturated compound.

The active energy ray-curable undercoating composition (Ia) used in the present invention may optionally comprise various additives, saturated resins, etc. Further, the active energy ray-curable undercoating composition (Ia) includes a desired solvent, and may be diluted with a solvent as required. Examples of the additives include sensitizers, polymerization inhibitors, antioxidants, defoaming agents, surface control agents, plasticizers, pigments, fillers, and the like. Examples of the saturated resin include saturated acrylic resins, saturated polyester resins, saturated urethane resins, and the like.

Examples of the solvents used for dilution include acetone, methyl ethyl ketone, methyl isobutyl ketone, and like ketone compounds; ethyl acetate, butyl acetate, methyl benzoate, methyl propionate, and like ester compounds; tetrahydrofuran, dioxane, dimethoxyethane, and like ether compounds; ethylene glycol monomethyl ether, ethylene glycol monoethyl ether, diethylene glycol monomethyl ether, propylene glycol monomethyl ether acetate, 3-methoxybutyl acetate, and like glycol ether compounds; and aromatic hydrocarbon compounds, aliphatic hydrocarbon compounds, and the like. These can be suitably used in a combination in accordance with the purpose of adjusting viscosity, application properties, etc.

There is no particular limitation to the nonvolatile matter of the active energy ray-curable undercoating composition (Ia). For example, the amount is preferably 20 to 90 mass, and more preferably 25 to 70 mass. These ranges are significant to make the coating film smooth and shorten the drying time.

(Ib) Photo- and Heat-Curable Undercoating Composition

The photo- and heat-curable undercoating composition (Ib) is not particularly limited, as long as it can be cured by an active energy ray irradiation or heating. Conventionally known photo- and heat-curable undercoating compositions can be used. To ensure weather resistance, particularly when a substrate is plastic, the photo- and heat-curable undercoating composition containing a polymerizable unsaturated compound, hydroxy-containing resin, photoinitiator, UV absorber, and light stabilizer can be preferably used.

The polymerizable unsaturated compound is not particularly limited, as long as it is a compound having at least one polymerizable unsaturated double bond in its chemical structure.

As the polymerizable unsaturated compound, one or at least two compounds listed in the explanation of "Active energy ray-curable undercoating composition (Ia)" can be suitably selected and used.

From the viewpoint of weather resistance, the amount of the polymerizable unsaturated compound in the photo- and heat-curable undercoating composition (Ib) is suitably 10 to 80 parts by mass, and preferably 20 to 70 parts by mass, per 100 parts by mass of the nonvolatile matter of the coating composition.

The polymerizable unsaturated compound in the photo- and heat-curable undercoating composition (Ib) can include, as a part of the component, an isocyanate-containing compound. The isocyanate-containing compound is preferably a radical polymerizable unsaturated group-containing compound (ib) (hereinbelow, simply abbreviated as "compound (ib)") that has an isocyanate equivalent amount of 300 to 3,800, and is obtained by reacting caprolactone-modified hydroxyalkyl(meth)acrylate and a polyisocyanate compound. Such a compound (ib) has excellent curability by active energy ray irradiation, and excellent curability at low temperature (specifically, room temperature to 100° C.). Because of this, the photo- and heat-curable undercoating composition (Ib) containing the compound (ib) can lower the heating temperature and shorten the heating time in the coating step.

Specific examples of the caprolactone modified hydroxyalkyl (meth)acrylate include "PLACCEL FA-1," "PLACCEL FA-2," "PLACCEL FA-2D," "PLACCEL FA-3," "PLACCEL FA-4," "PLACCEL FA-5," "PLACCEL FM-1," "PLACCEL FM-2," "PLACCEL FM-2D," "PLACCEL FM-3," "PLACCEL FM-4," and "PLACCEL FM-5" (trade name, all produced by Daicel Chemical Industries, Ltd.) Of these, caprolactone-modified hydroxyethyl acrylate is preferred from the viewpoint of active energy ray curability.

The polyisocyanate compound is a compound having two or more isocyanate groups per molecule. Examples thereof include hexamethylene diisocyanate, trimethyl hexamethylene diisocyanate, dimer acid diisocyanate, lysine diisocyanate, and like aliphatic polyisocyanate compounds; biuret-type adducts or isocyanuric ring adducts of these polyisocyanate compounds; isophorone diisocyanate, 4,4'-methylenebis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)cyclohexane, 1,4-cyclohexane diisocyanate, 1,3-cyclopentane diisocyanate, 1,2-cyclohexane diisocyanate, and like alicyclic diisocyanate compounds; biuret-type adducts or isocyanuric ring adducts of these polyisocyanates; xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m-phenylene diisocyanate, p-phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenylisocyanate), and like aromatic diisocyanate compounds; biuret-type adducts or isocyanuric ring adducts of these polyisocyanate compounds; triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate, and like polyisocyanate compounds having at least three isocyanate groups per molecule; biuret-type adducts or isocyanuric ring adducts of these polyisocyanate compounds; urethanized adducts obtained by reacting a polyol such as ethylene glycol, propylene glycol, 1,4-butylene glycol, dimethylolpropionic acid, polyalkylene glycol, trimethylolpropane, or hexanetriol, with a polyisocyanate compound in a ratio such that the amount of isocyanate is in excess relative to the amount of polyol hydroxy; and biuret-type adducts or isocyanuric ring adducts of these polyisocyanate compounds. These can be used singly, or as a mixture of two or more. Of these, from the viewpoint of the weather resistance of the coating film, isocyanurate ring adducts of aliphatic polyisocyanate compounds are preferable, and isocyanurate ring adducts of hexamethylene diisocyanate are particularly preferable.

The reaction of caprolactone-modified hydroxyalkyl (meth)acrylate and a polyisocyanate compound can be performed by a known method used when a hydroxy-containing compound is reacted with a polyisocyanate compound.

The reaction can be generally performed in an organic solvent. Examples of the organic solvent include aromatic hydrocarbon compounds such as toluene and xylene; ketone compounds such as acetone, methyl ethyl ketone, methyl isobutyl ketone, and cyclohexanone; and ester compounds such as ethyl acetate, propyl acetate, isobutyl acetate, and butyl acetate. These can be used singly, or as a mixture of two or more.

The reaction temperature is preferably at room temperature to 100° C., and the reaction time is preferably 1 to 10 hours.

In the reaction, a catalyst, such as dibutyltin dilaurate, dibutyl tin diethylhexoate, and dibutyltin sulfite may be used, if necessary. The addition amount of the catalyst is preferably 0.01 to 1 parts by mass, and more preferably 0.1 to 0.5 parts by mass, per 100 parts by mass of the total amount of the reaction starting material. A polymerization inhibitor such as hydroquinone monomethyl ether may be used. The amount of the polymerization inhibitor is preferably 0.01 to 1 part by mass per 100 parts by mass of the total amount of the reaction starting material.

Since the compound (i) has isocyanate, the mixing ratio of the caprolactone modified hydroxyalkyl (meth)acrylate and the polyisocyanate compound in the reaction is generally such that the equivalent ratio of isocyanate of the polyisocyanate compound to hydroxy of the caprolactone modified hydroxyalkyl (meth)acrylate is in excess (isocyanate/hydroxy >1.0). Further, the isocyanate equivalent of the compound (i) can be controlled by adjusting the mixing ratio.

The compound (i) has an isocyanate equivalent amount in the range of 300 to 3,800. Because the compound (i) has isocyanate, the photo- and heat-curable undercoating composition (Ib) used in the present invention has excellent curability at low temperature. Since the compound (i) has isocyanate, the compound (i) reacts with a hydroxy-containing resin mentioned below to form a strong undercoating film. The isocyanate equivalent amount of the compound (i) is preferably in the range of 500 to 2,500 from the viewpoint of the scratch resistance of the multi-layered coating film.

The isocyanate equivalent amount in the present specification is an isocyanate equivalent amount obtained by back titration using dibutylamine. Back titration is performed as follows. An excess amount of dibutylamine is added to a sample to perform reaction, and using Bromophenol Blue as a titration indicator, the residual dibutylamine is titrated by an aqueous hydrochloric acid solution.

The compound (i) preferably has an unsaturated group equivalent amount of 300 to 2,000, and more preferably 500 to 1,000. When the unsaturated group equivalent amount is within the aforementioned range, a multi-layered coating film having more excellent scratch resistance and weather resistance can be obtained.

In the specification, the amount of the unsaturated group can be obtained by adding dodecyl mercaptan to a radical polymerizable unsaturated group, and subjecting the residual dodecyl mercaptan to back titration with an iodine solution.

The molecular weight of the compound (i) is not particularly limited. The weight average molecular weight is preferably 500 to 2,000, and more preferably 800 to 1,500. The compound (i) having a weight average molecular weight within this range is significant to make an easy-to-handle coating composition viscosity.

It is suitable that the polymerizable unsaturated compound includes the compound (i) in an amount of 10 to 80 parts by mass, and preferably 20 to 70 parts by mass per 100 parts by mass of the nonvolatile matter thereof.

The hydroxy-containing resin is a resin having at least one hydroxy group per molecule. Examples of the hydroxy-containing resin include hydroxy-containing polyester resins, hydroxy-containing acrylic resins, hydroxy-containing polyether resins, hydroxy-containing polycarbonate resins, hydroxy-containing polyurethane resins, hydroxy-containing epoxy resins, hydroxy-containing alkyd resins, and the like. These can be used singly, or as a mixture of two or more. Of these, hydroxy-containing acrylic resins are preferable as the hydroxy-containing resins from the viewpoint of the weather resistance of the obtained coating film.

In general, the hydroxy-containing acrylic resin is produced by copolymerizing a hydroxy-containing polymerizable unsaturated monomer and other polymerizable unsaturated monomer(s) copolymerizable with the hydroxy-containing polymerizable unsaturated monomer by a method known per se, a solution polymerization method performed in an organic solvent, an emulsion polymerization method in water, etc.

The hydroxy-containing polymerizable unsaturated monomer is a compound having one or more hydroxy groups and one or more polymerizable unsaturated bonds per molecule, and examples thereof include monoesterified products of a dihydric alcohol having 2 to 8 carbon atoms and (meth)acrylic acid, such as 2-hydroxyethyl(meth)acrylate, 2-hydroxypropyl(meth)acrylate, 3-hydroxypropyl(meth)acrylate, and 4-hydroxybutyl(meth)acrylate; ε-caprolactone modified products of the monoesterified products of (meth)acrylic acid with a dihydric alcohol having 2 to 8 carbon atoms; N-hydroxymethyl (meth)acrylamide; allyl alcohol; (meth)acrylates having hydroxy-terminated polyoxyethylene chains; and the like.

Examples of other polymerizable unsaturated monomers copolymerizable with the hydroxy-containing polymerizable unsaturated monomer include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (tradename, produced by Osaka Organic Chemical Industry, Ltd.), cyclohexyl (meth)acrylate, methylcyclohexyl (meth)acrylate, t-butylcyclohexyl (meth)acrylate, and cyclododecyl (meth)acrylate; isobornyl-containing polymerizable unsaturated monomers such as isobornyl (meth)acrylate; adamantyl-containing polymerizable unsaturated monomers such as adamantyl (meth)acrylate; vinyl aromatic compounds such as styrene, α-methylstyrene, and vinyltoluene; alkoxysilyl-containing polymerizable unsaturated monomers such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane; perfluoroalkyl (meth)acrylates such as perfluorobutylethyl (meth)acrylate, perfluoroalkyl (meth)acrylate; fluorinated alkyl-containing polymerizable unsaturated monomers such as fluoroolefins; polymerizable unsaturated monomers having photopolymerizable functional groups such as maleimide; vinyl compounds such as N-vinylpyrrolidone, ethylene, butadiene, chloroprene, vinyl propionate, and vinyl acetate; carboxy-containing polymerizable unsaturated monomers such as (meth)acrylic acid, maleic acid, crotonic acid, and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide, and adducts of glycidyl (meth)acrylate with amines; polymerizable unsaturated monomers having two or more polymerizable unsaturated groups per molecule such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth)acrylates having alkoxy-terminated polyoxyethylene chains; sulfonic acid-containing polymerizable unsaturated monomers such as 2-acrylamide-2-methylpropanesulfonic acid, allylsulfonic acid, styrenesulfonic acid sodium salts, sulfoethyl methacrylate and sodium salts and ammonium salts thereof; phosphoric acid-containing polymerizable unsaturated monomers such as 2-acryloyloxyethyl acid phosphate, 2-methacryloyloxyethyl acid phosphate, 2-acryloyloxypropyl acid phosphate, and 2-methacryloyloxypropyl acid phosphate; polymerizable unsaturated monomers having UV-absorbing functional groups such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-chrotonoyl-4-crotonoyloxy-2,2,6,6,6-tetramethylpiperidine; carbonyl-containing polymerizable unsaturated monomers such as acrolein, diacetone acrylamide, diacetone methacrylamide, acetoacetoxyethyl methacrylate, formylstyrol, $C_{4-7}$ vinyl alkyl ketones (e.g., vinyl methyl ketone, vinyl ethyl ketone, vinyl butyl ketone); and the like. Such polymerizable unsaturated monomers copolymerizable with the hydroxy-containing polymerizable unsaturated monomer can be used singly, or in a combination of two or more.

From the viewpoint of the curability of the photo- and heat-curable undercoating composition (Ib) at low temperature, and the water resistance of the obtained multi-layered coating film, the hydroxy-containing resin generally preferably has a hydroxy value of 30 to 300 mg KOH/h, particularly preferably 40 to 250 mg KOH/g, and more preferably 50 to 200 mg KOH/g.

When the photo- and heat-curable undercoating composition (Ib) includes the compound (i), the hydroxy-containing resin preferably contains acid to improve the reactivity with the compound (i). The hydroxy-containing resin preferably has an acid value in the range of 1 to 25 mg KOH/g, and particularly preferably 1 to 20 mg KOH/g.

The hydroxy-containing resin generally has a weight average molecular weight of 3,000 to 100,000, preferably 4,000 to 50,000, and more preferably 5,000 to 30,000.

The amount of the hydroxy-containing resin in the photo- and heat-curable undercoating composition (Ib) is suitably 10 to 80 parts by mass, and preferably 20 to 70 parts by mass per 100 parts by mass of the nonvolatile matter of the coating composition.

The photo- and heat-curable undercoating composition (Ib) can include, if necessary, isocyanate compounds other than the compound (i). The isocyanate compound is a compound having isocyanate in a molecule, and examples thereof include the polyisocyanate compounds listed in the explanation of "Compound (i)" above. Of these, from the viewpoint of the weather resistance of the coating film, isocyanurate ring adducts of aliphatic polyisocyanates are preferable, and isocyanurate ring adducts of hexamethylene diisocyanates are particularly preferable.

When the photo- and heat-curable undercoating composition (Ib) contains the compound (ib) and an isocyanate compound, it is desirable that the proportion of the hydroxy-containing resin and the compound (ib) to the isocyanate compound be selected so that the equivalent ratio (NCO/OH) of the total amount of isocyanate contained in the compound (ib) and the isocyanate compound to the hydroxy in the hydroxy-containing resin is 0.30 to 2.00, preferably 0.50 to 1.80.

The photoinitiator is not particularly limited, as long as it absorbs an active energy ray and generates radicals.

As the photoinitiator, one or at least two compounds listed in the explanation of "Active energy ray-curable undercoating composition (Ia)" above can be selected and used.

The amount of the photoinitiator in the photo- and heat-curable undercoating composition (Ib) is not particularly limited. The amount of the photoinitiator is generally about 1 to 20 parts by mass, preferably 2 to 10 parts by mass per 100 parts by mass of the nonvolatile matter of the polymerizable unsaturated compound.

By absorbing incident light and transforming light energy into a harmless form like heat, the UV absorber has an effect of inhibiting the attainment of the start of the deterioration of the coated film.

The UV absorber can be suitably selected from those listed in the explanation of "Active energy ray-curable undercoating composition (Ia)" above.

The amount of the UV absorber in the photo- and heat-curable undercoating composition (Ib) is suitably 0.5 to 20 parts by mass, and preferably 1 to 15 parts by mass per 100 parts by mass of the nonvolatile matter of the coating composition from the viewpoint of weather resistance, etc.

On the other hand, the light stabilizer can be used as a radical chain inhibitor that catches an active radical type generated in the deterioration process of the coating film; and examples thereof include hindered amine compounds, etc.

The light stabilizer can be suitably selected from, for example, those listed in the explanation of "Active energy ray-curable undercoating composition (Ia)" above.

From the viewpoint of weather resistance, the amount of the light stabilizer in the photo- and heat-curable undercoating composition (Ib) is 0.1 to 10 parts by mass, and preferably 0.5 to 5 parts by mass per 100 parts by mass of the nonvolatile matter of the coating composition.

The photo- and heat-curable undercoating composition (Ib) may further comprise various additives, if necessary. The photo- and heat-curable undercoating composition (Ib) optionally includes a solvent, and may be diluted with the solvent. Examples of the additive include sensitizing agents, polymerization inhibitors, anti-oxidants, antifoaming agents, surface control agents, plasticizers, pigments, fillers, and the like.

The solvent can be suitably selected from, for example, those listed in the explanation of "Active energy ray-curable undercoating composition (Ia)." These can be used in combination, if necessary, according to the purposes such as viscosity adjustment and application property adjustment.

The amount of the nonvolatile matter of the photo- and heat-curable undercoating composition (Ib) is not particularly limited. The amount thereof is preferably 20 to 100 mass %, and more preferably 25 to 70 mass % per 100 mass % of the undercoating composition. These ranges are significant to make the coating film smooth and shorten the drying time.

(Ic) Room Temperature- or Heat-Curable Undercoating Composition

The room temperature- or heat-curable undercoating composition (Ic) is not particularly limited as long as it can be dried or cured at room temperature, or cured by heating. Conventionally known room temperature- or heat-curable coating compositions can be used. To ensure the weather resistance of the multi-layered coating film obtained particularly when the substrate is made of plastic, a room temperature- or heat-curable undercoating composition containing an acrylic resin, UV absorber, and light stabilizer can be preferably used.

Conventionally known acrylic resins can be used without limitation. For example, the acrylic resin may include at least one crosslinkable functional group selected from the group consisting of hydroxy, carboxy, alkoxy silyl, epoxy, and the like. In general, those obtained by copolymerizing polymerizable unsaturated monomer mixtures can be preferably used.

Examples of the polymerizable unsaturated monomer include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (tradename, produced by Osaka Organic Chemical Industry, Ltd.), cyclohexyl (meth)acrylate, methylcyclohexyl (meth) acrylate, t-butylcyclohexyl (meth)acrylate, and cyclododecyl (meth)acrylate; isobornyl-containing polymerizable unsaturated monomers such as isobornyl (meth)acrylate; adamantyl-containing polymerizable unsaturated monomers such as adamantyl (meth)acrylate; vinyl aromatic compounds such as styrene, α-methylstyrene, and vinyltoluene; alkoxysilyl-containing polymerizable unsaturated monomers such as vinyltrimethoxysilane, vinyltriethoxysilane, vinyltris(2-methoxyethoxy)silane, and γ-(meth)acryloyloxypropyltrimethoxysilane; perfluoroalkyl (meth)acrylates such as perfluorobutylethyl (meth)acrylate, perfluoroalkyl (meth)acrylate; fluorinated alkyl-containing polymerizable unsaturated monomers such as fluoroolefins; polymerizable unsaturated monomers having photopolymerizable functional groups such as maleimide; vinyl compounds such as N-vinylpyrrolidone, ethylene, butadiene, chloroprene, vinyl propionate, and vinyl acetate; hydroxy-containing polymerizable unsaturated monomers including monoesterified products of (meth)acrylic acid and a dihydric alcohol having 2 to 8 carbon atoms such as 2-hydroxyethyl (meth)acrylate, 2-hydroxypropyl(meth)acrylate, 3-hydroxypropyl(meth)acrylate, and 4-hydroxybutyl(meth)acrylate, ε-caprolactone modified products of the monoesterified products of (meth)acrylic acid with a dihydric alcohol having 2 to 8 carbon atoms, N-hydroxymethyl (meth)acrylamide, allyl alcohol, and polyoxyethylene (meth)acrylate; carboxy-containing polymerizable unsaturated monomers such as (meth)acrylic acid, maleic acid, crotonic acid, and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide, and adducts of glycidyl (meth)acrylate with amines; polymerizable unsaturated monomers having two or more polymerizable unsaturated groups per molecule such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth)acrylates having alkoxy-terminated polyoxyethylene chains; sulfonic acid-containing polymerizable unsaturated monomers such as 2-acrylamide-2-methylpropanesulfonic acid, allylsulfonic acid, styrenesulfonic acid sodium salts, sulfoethyl methacrylate and sodium salts and ammonium salts thereof; phosphoric acid-containing polymerizable unsaturated monomers such as 2-acryloyloxyethyl acid phosphate, 2-methacryloyloxyethyl acid phosphate, 2-acryloyloxypropyl acid phosphate, and 2-methacryloyloxypropyl acid phosphate; polymerizable unsaturated monomers having UV-absorbing functional groups such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-chrotonoyl-4-crotonoyloxy-2,2,6,6-tetramethylpiperidine; carbonyl-containing polymerizable unsaturated monomers such as acrolein, diacetone acrylamide, diacetone methacrylamide, acetoacetoxyethyl methacrylate, formylstyrol, $C_{4-7}$ vinyl alkyl ketones (e.g., vinyl methyl ketone, vinyl ethyl ketone, vinyl butyl ketone); and the like. Such monomers can be used singly, or in a combination of two or more.

When the hydroxy-containing monomer is used as the polymerized unsaturated monomer, melamine resins or polyisocyanate compounds mentioned later can be used as a crosslinking agent.

When the polymerizable unsaturated monomer uses a UV-absorbing polymerizable unsaturated monomer and/or a UV-stable polymerizable unsaturated monomer as at least a part of the component, since a UV-absorbing functional group or a UV-stabilizing functional group is introduced into an acrylic resin, it is not necessary to mix a UV absorber or light stabilizer mentioned later with the undercoating composition (Ic).

The copolymerization of the polymerizable unsaturated monomer can be performed by a method known per se, for example, a solution polymerization method performed in an organic solvent, etc. Examples of a copolymerization method by using a solution polymerization method include a method in which a mixture of the monomer component and a radical polymerization initiator is dissolved or dispersed in an organic solvent, and polymerized by heating while stirring at about 80 to 200° C. for about 1 to 10 hours.

Examples of the organic solvents usable in the copolymerization include acetone, methyl ethyl ketone, methyl isobutyl ketone, and like ketone compounds; ethyl acetate, butyl acetate, methyl benzoate, methyl propionate, and like ester compounds; tetrahydrofuran, dioxane, dimethoxyethane, and like ether compounds; ethylene glycol monomethyl ether, ethylene glycol monoethyl ether, diethylene glycol monomethyl ether, propylene glycol monomethyl ether acetate, 3-methoxybutyl acetate, and like glycol ether compounds; and aromatic hydrocarbon compounds, aliphatic hydrocarbon compounds, etc. These organic solvents can be used singly, or in a combination.

Although the weight average molecular weight of the acrylic resin obtained as above is not particularly limited, it is generally preferably in the range of 1,000 to 200,000, and particularly preferably 2,000 to 100,000 from the viewpoint of weather resistance.

From the viewpoint of the weather resistance of the obtained multi-layered coating film, the amount of the acrylic resin in the room temperature- or heat-curable undercoating composition (Ic) is suitably 50 to 99.4 parts by mass, and preferably 70 to 99.4 parts by mass per 100 parts by mass of the nonvolatile matter of the coating composition. When the acrylic resin is obtained by polymerizing a polymerized unsaturated monomer mixture containing a UV-absorbing polymerizable unsaturated monomer and/or a UV-stable polymerizable unsaturated monomer, the amount of the acrylic resin may be 50 to 100 parts by mass, and preferably 70 to 100 parts by mass per 100 parts by mass of the nonvolatile matter of the coating composition.

By absorbing incident light and transforming light energy into a harmless form like heat, the UV absorber has an effect of inhibiting the attainment of the start of the deterioration of the coated film.

The UV absorber can be selected, for example, from those listed in the explanation of "Active energy ray-curable undercoating composition (Ia)" above.

From the viewpoint of weather resistance, etc., the amount of the UV absorber in the undercoating composition (Ic) is suitably 0.5 to 20 parts by mass, and preferably 1 to 15 parts by mass per 100 parts by mass of the nonvolatile matter of the coating composition.

On the other hand, the light stabilizer can be used as a radical chain inhibitor that catches an active radical type generated in the deterioration process of the coating film, and examples thereof include hindered amine compounds, etc.

The light stabilizer can be suitably selected from, for example, those listed in the explanation of "Active energy ray-curable undercoating composition (Ia)" above.

From the viewpoint of weather resistance, the amount of the light stabilizer in the room temperature- or heat-curable undercoating composition (IC) is 0.1 to 10 parts by mass, and preferably 0.5 to 5 parts by mass per 100 parts by mass of the nonvolatile matter of the coating composition.

The coating composition (Ic) can contain a crosslinking agent, if necessary. Examples of the crosslinking agent include those having one or more functional groups that can react with the functional group in the acrylic resin, such as melamine resins, urea resins, blocked polyisocyanate compounds, epoxy compounds, carboxy-containing compounds, acid anhydrides, and alkoxysilane-containing compounds.

The room temperature- or heat-curable undercoating composition (Ic) used in the present invention may contain other resins or various additives, if necessary. The room temperature- or heat-curable undercoating composition (Ic) includes a desired solvent, and may be diluted with the solvent. Examples of the other resins include polyester resins, alkyd resins, urethane resins, epoxy resins, silicon resins, fluoro resins, fibrin derivatives, and the like.

Examples of the additives include cured catalysts, polymerization inhibitors, antioxidants, defoaming agents, surface control agents, plasticizers, pigments, fillers, and the like.

The solvent can be suitably selected from those listed in the explanation of "Active energy ray-curable undercoating composition (Ia)" above. The solvents can be optionally used in combination in accordance with the purposes such as viscosity adjustment and application adjustment.

The nonvolatile matter of the room temperature- or heat-curable undercoating composition (Ic) are not particularly limited. For example, it is preferably 20 to 90 mass, and more preferably 25 to 70 mass. These ranges are significant to make a coating film smooth, and shorten the drying time.

(II) Active Energy Ray-Curable Top Coating Composition

The active energy ray-curable top coating composition (II) of the present invention comprises a silsesquioxane compound (a) and a photoinitiator (b).

(a) Silsesquioxane Compound

The silsesquioxane compound, which is the component (a), has organic groups each directly bonded to a silicon atom. At least one of the organic groups each directly bonded to the silicon atom is an organic group having one or more urethane bonds and one (meth)acryloyloxy group.

The term "silsesquioxane compound" used herein indicates not only a silsesquioxane compound having a structure in which all of the Si—OH groups (hydroxy silyl groups) are hydrolyzed and condensed, but also silsesquioxane compounds having a rudder structure, an incomplete cage structure, or a random structure, in which Si—OH groups remain.

In the silsesquioxane compound (a), the proportion of the silsesquioxane compound having a structure in which all of the Si—OH groups are hydrolyzed and condensed is preferably 80 mass % or more, more preferably 90 mass % or more, and even more preferably 100 mass % or more in terms of liquid stability and weather resistance.

An example of the silsesquioxane compound (a) of the present invention is a silsesquioxane compound in which the organic group having one or more urethane bonds and one (meth)acryloyloxy group is represented by the formula (A) below:

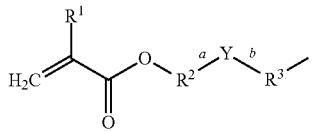
(A)

wherein $R^1$ represents hydrogen or methyl, $R^2$ represents $C_{1-10}$ divalent hydrocarbon, $R^3$ represents $C_{1-10}$ divalent hydrocarbon, and Y represents

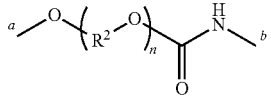

wherein $R^2$ is as defined above, and n represents an integer of 0 to 9,

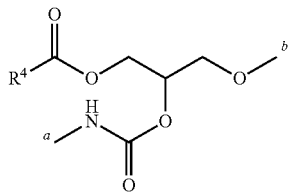

wherein $R^4$ represents a substituted or unsubstituted $C_{1-6}$ monovalent hydrocarbon group, or

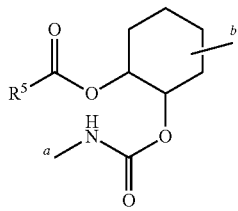

wherein $R^5$ represents a substituted or unsubstituted $C_{1-6}$ monovalent hydrocarbon group.

The silsesquioxane compound (a) of the present invention may include, among the organic groups represented by the formula (A) above, one kind of organic group, or two or more kinds of organic groups.

In other words, examples of the silsesquioxane compound (a) of the present invention include a silsesquioxane compound in which an organic group having one or more urethane bonds and one (meth)acryloyloxy group is at least one member selected from the group consisting of organic groups represented by the formulae (I) to (III) below:

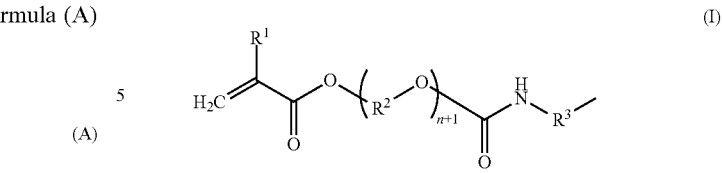
(I)

wherein $R^1$ represents hydrogen or methyl, $R^2$ represents $C_{1-10}$ divalent hydrocarbon, $R^3$ represents $C_{1-10}$ divalent hydrocarbon, and n represents an integer of 0 to 9;

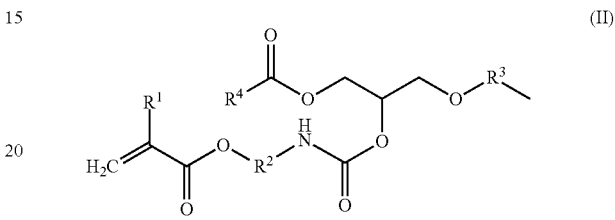
(II)

wherein $R^1$ to $R^3$ are as defined above, and $R^4$ represents substituted or unsubstituted $C_{1-6}$ monovalent hydrocarbon; and

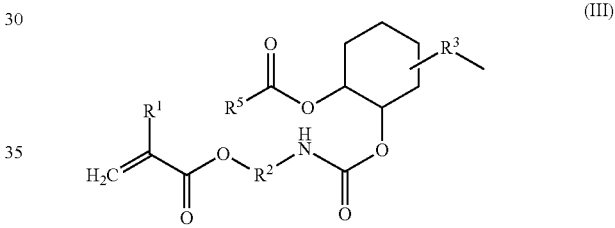
(III)

wherein $R^1$ to $R^3$ are as defined above, and $R^5$ represents substituted or unsubstituted $C_{1-6}$ monovalent hydrocarbon.

$R^2$ is not particular limited, as long as it represents $C_{1-10}$ divalent hydrocarbon. Specific examples thereof include alkylene groups such as methylene, ethylene, 1,2-propylene, 1,3-propylene, 1,2-butylene, 1,4-butylene, and hexylene; cyclo alkylene groups such as cyclohexylene; arylene groups such as phenylene, xylylene, and biphenylene; and the like. Of these, $C_{1-6}$ divalent hydrocarbon groups, in particular, ethylene, 1,2-propylene, and 1,4-butylene are preferred because they have superior heat resistance, scratch resistance, and compatibility with polymerizable unsaturated compounds having high polarity.

$R^3$ is not particularly limited, as long as it represents $C_{1-10}$ divalent hydrocarbon. Specific examples thereof include alkylene groups such as methylene, ethylene, 1,2-propylene, 1,3-propylene, 1,2-butylene, 1,4-butylene, and hexylene; cyclo alkylene groups such as cyclohexylene; arylene groups such as phenylene, xylylene, and biphenylene; and the like. Of these, $C_{1-6}$ divalent hydrocarbon groups, in particular, ethylene and 1,3-propylene, are preferred because they have superior heat resistance, scratch resistance, and compatibility with polymerizable unsaturated compounds having high polarity.

n is not particularly limited, as long as it is an integer of 0 to 9. n is preferably an integer of 0 to 5, more preferably 0 to 3, and most preferably 0 or 1.

$R^4$ is not particularly limited, as long as it is substituted or unsubstituted $C_{1-6}$ monovalent hydrocarbon. Specific examples include monovalent acyclic aliphatic hydrocarbon groups or monovalent cyclic aliphatic hydrocarbon groups such as methyl, ethyl, n-propyl, isopropyl, n-butyl, isobutyl, tert-butyl, sec-butyl, n-pentyl, isopentyl, neopentyl, cyclopentyl, n-hexyl, isohexyl, cyclohexyl, and other straight or branched alkyl groups; and trifluoromethyl, 3,3,3-trifluoro-n-propyl, and other fluorine-containing alkyl groups. Methyl is particularly preferred since it has excellent compatibility with a polymerizable unsaturated compound having high polarity.

$R^5$ is not particularly limited, as long as it is substituted or unsubstituted $C_{1-6}$ monovalent hydrocarbon. Specific examples include monovalent acyclic aliphatic hydrocarbon groups or monovalent cyclic aliphatic hydrocarbon groups such as methyl, ethyl, n-propyl, isopropyl, n-butyl, isobutyl, tert-butyl, sec-butyl, n-pentyl, isopentyl, neopentyl, cyclopentyl, n-hexyl, isohexyl, cyclohexyl, and other straight or branched alkyl groups; trifluoromethyl, 3,3,3-trifluoro-n-propyl, and other fluorine-containing alkyl groups. Methyl is particularly preferred since it has excellent compatibility with a polymerizable unsaturated compound having high polarity.

The organic group represented by the formula (I) is preferably an organic group in which $R^1$ is hydrogen, $R^2$ is ethylene or 1,4-butylene, $R^3$ is ethylene or 1,3-propylene, and n is 0 because it has superior heat resistance, scratch resistance, compatibility with a polymerizable unsaturated compound having high polarity, and active energy-ray curability.

The organic group represented by the formula (II) is preferably an organic group in which $R^4$ is methyl, $R^3$ is ethylene or 1,3-propylene, $R^1$ is hydrogen, and $R^2$ is ethylene to attain superior heat resistance, scratch resistance, compatibility with polymerizable unsaturated compounds having high polarity, and active energy-ray curability.

The organic group represented by the formula (III) is preferably an organic group in which $R^5$ is methyl, $R^3$ is ethylene or 1,3-propylene, $R^1$ is hydrogen, and $R^2$ is ethylene to attain superior heat resistance, scratch resistance, compatibility with polymerizable unsaturated compounds having high polarity, and active energy-ray curability.

The silsesquioxane compound (a) of the present invention may have a single composition, or may be a mixture of compounds having different compositions.

The weight average molecular weight of the silsesquioxane compound (a) is not particularly limited. The weight average molecular weight is preferably 1,000 to 100,000, and more preferably 1,000 to 10,000. These ranges are significant in terms of the heat resistance of coating films obtained from the silsesquioxane compound of the present invention, and the viscosity and application properties of the active energy ray-curable top coating composition (II).

The silsesquioxane compound (a) may be produced by various methods. For example, the compound may be produced by the method shown in the following production method A or B.

Production Method A

For example, the production method A is carried out using a starting material containing a hydrolyzable silane having an organic group that is directly bonded to a silicon atom and that has one or more urethane bonds and one (meth)acryloyloxy group.

Specifically, the silsesquioxane compound (a) is produced, for example, by hydrolysis condensation reaction of the starting material using a hydrolyzable silane represented by the formula (IV) below; and optionally, a hydrolyzable silane other than the hydrolyzable silane represented by the formula (IV) below, in the presence of a catalyst.

$R^6$ in the formula (IV) is an organic group having one or more urethane bonds and one (meth)acryloyloxy group. X is the same or different, and each represents chlorine or a $C_{1-6}$ alkoxy group.

Examples of $C_{1-4}$ alkoxy groups include $C_{1-6}$ (preferably $C_{1-4}$) straight or branched alkoxy groups. Specifically, methoxy, ethoxy, n-propoxy, isopropoxy, n-butoxy, isobutoxy, tert-butoxy, sec-butoxy, n-pentyloxy, 1-ethylpropoxy, isopentyloxy, neopentyloxy, n-hexyloxy, 1,2,2-trimethyl propoxy, 3,3-dimethylbutoxy, 2-ethylbutoxy, isohexyloxy, 3-methyl pentyloxy, etc., are included.

Accordingly, specific examples of X include chlorine, methoxy, ethoxy, propoxy, butoxy, and the like.

Hydrolyzable silanes other than those represented by the formula (IV) are not particularly limited, as long as they are capable of producing a silsesquioxane compound through hydrolysis condensation reaction with the hydrolyzable silane represented by the formula (IV). Specific examples thereof include methyltrimethoxysilane, methyltriethoxysilane, ethyltrimethoxysilane, ethyltriethoxysilane, and like alkyltrialkoxysilanes; 3-(meth)acryloyloxypropyl trimethoxysilane, 3-(meth)acryloyloxypropyl triethoxysilane, and like 3-(meth)acryloyloxypropyl trialkoxysilanes; vinyltrimethoxysilane, vinyltriethoxysilane, and like vinyltrialkoxysilanes; and the like.

The hydrolyzable silane represented by the formula (IV) can be obtained by reacting, for example, isocyanate-containing trialkoxysilane and hydroxy-containing (meth)acrylic acid ester.

Specific examples of hydrolyzable silanes represented by the formula (IV) include those represented by the formula (V) below:

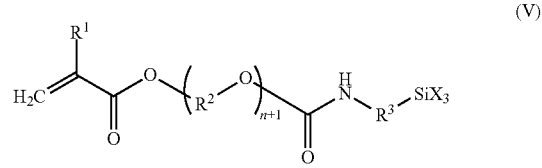

wherein $R^1$, $R^2$, $R^3$, n, and X are as defined above.

The hydrolyzable silane represented by the formula (V) can be obtained by reacting, for example, a hydrolyzable silane represented by the formula (VI) below and a compound represented by the formula (VII) below:

wherein R³ and X are as defined above, and

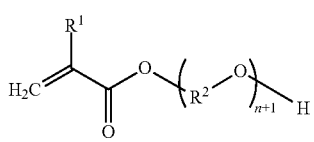
(VII)

wherein R¹, R², and n are as defined above.

Examples of compounds represented by the formula (VI) include 3-isocyanate propyltrimethoxysilane, 3-isocyanatepropyl triethoxysilane, and the like.

Examples of compounds represented by the formula (VII) include 2-hydroxyethyl(meth)acrylate, 2-hydroxypropyl(meth)acrylate, 3-hydroxypropyl(meth)acrylate, 4-hydroxybutyl(meth)acrylate, diethyleneglycol mono(meth)acrylate, triethyleneglycol mono(meth)acrylate, dipropyleneglycol mono(meth)acrylate, and the like.

The reaction of the hydrolyzable silane represented by the formula (VI) and the compound represented by the formula (VII) can be performed according to an ordinary method of reacting isocyanate and hydroxy.

The proportion of the hydrolyzable silane represented by the formula (VI) and the compound represented by the formula (VII) used in the above reaction scheme is such that the latter is about 0.90 to about 1.10 mol, and preferably about 0.95 to about 1.05 mol, per mol of the former.

The reaction temperature is 0 to 200° C., preferably 20 to 200° C., and more preferably 20 to 120° C. The reaction can be performed at any pressure; however, the pressure is preferably in the range of 0.02 to 0.2 MPa, and particularly 0.08 to 0.15 MPa. The reaction usually completes in about 2 to about 10 hours.

In the reaction, a catalyst may be suitably used. Examples of the catalyst include tertiary amines such as triethylamine, organic metal compounds such as dibutyltin dilaurate, and the like.

In the reaction, a solvent may be suitably used. Examples of the solvent include acetone, methyl ethyl ketone, methyl isobutyl ketone, cyclohexanone, methyl amyl ketone, ethyl isoamyl ketone, diisobutyl ketone, methyl hexyl ketone, and like ketones; ethyl acetate, butyl acetate, methyl benzoate, methyl propionate, and like esters; tetrahydrofuran, dioxane, dimethoxyethane, and like ethers; propylene-glycol-monomethyl-ether acetate, 3-methoxy butyl acetate, and like glycol ethers; toluene, xylene, and like aromatic hydrocarbons; aliphatic hydrocarbons; and the like.

Examples of hydrolyzable silanes other than those represented by the formula (IV) include hydrolyzable silanes represented by the formula (VIII) or (IX) below:

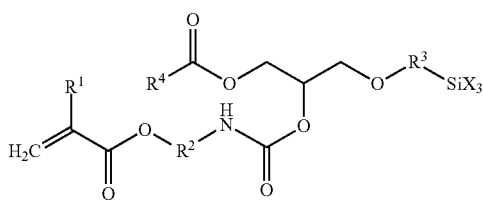
(VIII)

wherein R¹, R², R³, R⁴, and X are as defined above, and

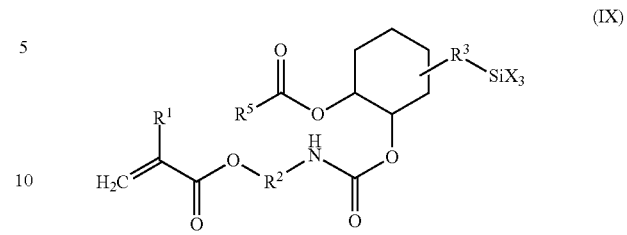
(IX)

wherein R¹, R², R³, R⁵, and X are as defined above.

The hydrolyzable silane represented by the formula (VIII) can be obtained, for example, by reacting a hydrolyzable silane represented by the formula (X) below with a compound represented by the formula (XI) below, thereby yielding a product, and by further reacting a compound represented by the formula (XII) below with the product:

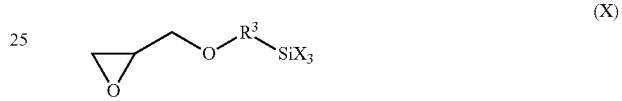
(X)

wherein R³ and X are as defined above,

(XI)

wherein R⁴ is as defined above, and

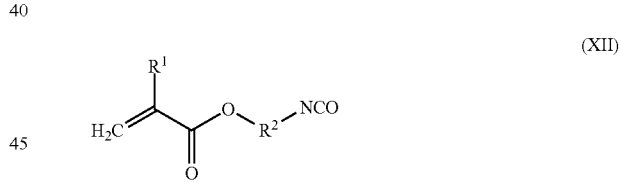
(XII)

wherein R¹ and R² are as defined above.

Examples of the hydrolyzable silane represented by the formula (X) include 3-glycidoxypropyltrimethoxysilane, 3-glycidoxypropyltriethoxysilane, and the like.

Examples of the compound represented by the formula (XI) include acetic acid, propionic acid, butyric acid, valeric acid, caproic acid, enanthic acid, trifluoroacetic acid, 3,3,3-trifluoropropionic acid, and the like.

Examples of the compound represented by the formula (XII) include isocyanatemethyl(meth)acrylate, 2-isocyanateethyl (meth)acrylate, 3-isocyanatepropyl(meth)acrylate, isocyanateoctyl(meth)acrylate, and the like.

The hydrolyzable silane represented by the formula (IX) can be obtained, for example, by reacting a hydrolyzable silane represented by the formula (XIII) below with a compound represented by the formula (XIV) below, thereby yielding a product, and by further reacting a compound represented by the formula (XV) below with the product:

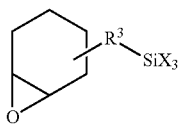

wherein R³ and X are as defined above,

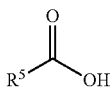

wherein R⁵ is as defined above, and

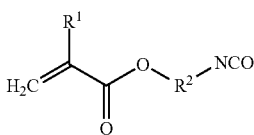

wherein R¹ and R² are as defined above.

Examples of the hydrolyzable silane represented by the formula (XIII) include 2-(3,4-epoxycyclohexyl)ethyltrimethoxysilane, 2-(3,4-epoxycyclohexyl)ethyltriethoxysilane, and the like.

As the compound represented by the formula (XIV), compounds listed in the description of the compound represented by the formula (XI) can be used.

As the compound represented by the formula (XV), compounds listed in the description of the compound represented by the formula (XII) can be used.

The reaction of the hydrolyzable silane represented by the formula (X) and the compound represented by the formula (XI), and the reaction of the hydrolyzable silane represented by the formula (XIII) and the compound represented by the formula (XIV) can be carried out according to an ordinary method of reacting carboxy and epoxy.

The proportion of the hydrolyzable silane represented by the formula (X) and the compound represented by the formula (XI) used in the reaction is such that the latter is about 0.80 to about 1.20 mol, and preferably about 0.90 to about 1.10 mol, per mol of the former.

The proportion of the compound represented by the formula (XIII) and the compound represented by the formula (XIV) is such that the latter is about 0.80 to about 1.20 mol, and preferably about 0.90 to about 1.10 mol, per mol of the former.

The reaction temperature is, for example, 0 to 200° C., preferably 20 to 200° C., and more preferably 20 to 120° C. The reaction generally completes in about 10 to about 24 hours.

In the reaction, a catalyst may be suitably used. Specific examples of the catalyst include tertiary amines such as triethylamine and benzyldimethylamine; quaternary ammonium salts such as tetramethylammonium chloride, tetraethylammonium bromide, and tetrabutylammonium bromide; secondary amine salts such as acetate and formate of diethylamine; alkali metal or alkaline earth metal hydroxides such as sodium hydroxide and calcium hydroxide; alkali metal or alkaline earth metal salts such as sodium acetate and calcium acetate; imidazoles; cyclic nitrogen-containing compounds such as diazabicycloundecene; phosphorus compounds such as triphenylphosphine and tributylphosphine; and the like. The amount of the catalyst used is not limited, but is specifically, for example, 0.01 to 5 mass % based on the amount of the reaction starting material.

In the reaction, a solvent may be suitably used. There is no limitation on the solvent, and examples of the solvent include acetone, methyl ethyl ketone, methyl isobutyl ketone, cyclohexanone, methyl amyl ketone, ethyl isoamyl ketone, diisobutyl ketone, methyl hexyl ketone, and like ketones; ethyl acetate, butyl acetate, methyl benzoate, methyl propionate, and like esters; tetrahydrofuran, dioxane, dimethoxyethane, and like ethers; ethylene-glycol-monomethyl-ether, ethylene-glycol-monoethyl-ether, diethylene-glycol-monomethyl-ether, propylene-glycol-monomethyl-ether acetate, 3-methoxy butyl acetate, and like glycol ethers; toluene, xylene, and like aromatic hydrocarbons; aliphatic hydrocarbons; and the like.

The reaction of the compound represented by the formula (XII) with the reaction product (hereinafter sometimes simply referred to as reaction product (X-XI)) that is obtained by reacting the hydrolyzable silane represented by the formula (X) and the compound represented by the formula (XI), and the reaction of the compound represented by the formula (XV) with the reaction product (hereinafter sometimes simply referred to as reaction product (XIII-XIV)) that is obtained by reacting the hydrolyzable silane represented by the formula (XIII) and the compound represented by the formula (XIV) can be carried out according to an ordinary method of reacting hydroxy and isocyanate.

The proportion of the reaction product (X-XI) and the compound represented by the formula (XII) used in the above reaction is such that the latter is about 0.90 to about 1.10 mol, and preferably about 0.95 to about 1.05 mol, per mol of the former.

The proportion of the reaction product (XIII-XIV) and the compound represented by the formula (XV) used in the above reaction is such that the latter is about 0.90 to about 1.10 mol, and preferably about 0.95 to about 1.05 mol, per mol of the former.

The reaction temperature is, for example, 0 to 200° C., preferably 20 to 200° C., and more preferably 20 to 120° C. The reaction can be carried out at any pressure; however, the pressure is preferably in the range of 0.02 to 0.2 MPa, and more preferably in the range of 0.08 to 0.15 MPa. The reaction generally completes in about 2 to about 10 hours.

In the reaction, a catalyst may be suitably used. Examples of the catalyst include tertiary amines such as triethylamine; organic metal compounds such as dibutyltin dilaurate; and the like.

In the reaction, a solvent may be suitably used. Examples of the solvent include acetone, methyl ethyl ketone, methyl isobutyl ketone, cyclohexanone, methyl amyl ketone, ethyl isoamyl ketone, diisobutyl ketone, methyl hexyl ketone, and like ketones; ethyl acetate, butyl acetate, methyl benzoate, methyl propionate, and like esters; tetrahydrofuran, dioxane, dimethoxyethane, and like ethers; propylene glycol monomethyl ether acetate, 3-methoxy butyl acetate, and like glycol ethers; toluene, xylene, and like aromatic hydrocarbons; aliphatic hydrocarbons; and the like.

In the production method of the present invention, the silsesquioxane compound of the present invention is specifically obtained as follows:

[1] The hydrolyzable silane represented by the formula (IV) is used as a starting material and subjected to hydrolysis condensation reaction in the presence of a catalyst, or

[2] the hydrolyzable silane represented by the formula (IV) and the other hydrolyzable silanes are used as starting materials and subjected to hydrolysis condensation reaction in the presence of a catalyst.

As the catalyst, a basic catalyst is preferably used. Specific examples of the basic catalyst include alkali metal hydroxides such as potassium hydroxide, sodium hydroxide, and cesium hydroxide; ammonium hydroxide salts such as tetramethylammonium hydroxide, tetraethylammonium hydroxide, tetrabutylammonium hydroxide, and benzyl trimethylammonium hydroxide; ammonium fluoride salts such as tetrabutylammonium fluoride; and the like.

Although the amount of the catalyst used is not limited, the use of an overly large amount of the catalyst results in high costs and difficulties in removing the catalyst, while the use of an overly small amount of the catalyst slows the reaction. Therefore, the amount of the catalyst is preferably 0.0001 to 1.0 mol, and more preferably 0.0005 to 0.1 mol, per mol of the hydrolyzable silane.

When the hydrolysis condensation reaction is carried out (the above process [1] or [2]), water is used. The proportion of the hydrolyzable silane to water is not particularly limited. The amount of water used is preferably 0.1 to 100 mol, and more preferably 0.5 to 3 mol, per mol of the hydrolyzable silane. When the amount of water is too low, the reaction proceeds slowly, possibly resulting in a reduced yield of the target silsesquioxane compound. Conversely, when the amount of water is too high, the molecular weight of the resulting product is increased, possibly resulting in a reduced amount of a product having the desired structure. Moreover, when a basic catalyst is used in the form of an aqueous solution, water used in the reaction may be substituted by the solution, or water may be further added.

In the above hydrolysis condensation reaction, an organic solvent may or may not be used. The use of an organic solvent is preferred in terms of preventing gelation and controlling viscosity during production. As the organic solvent, polar organic solvents and nonpolar organic solvents may be used alone, or as a mixture thereof.

Examples of the polar organic solvent include lower alcohols such as methanol, ethanol, and 2-propanol; ketones such as acetone, and methyl isobutyl ketone; and ethers such as tetrahydrofuran. Particularly, acetone and tetrahydrofuran are preferred because they have a low boiling point, and their use results in a homogeneous system and improved reactivity. Preferred examples of the nonpolar organic solvent include hydrocarbon-based solvents; toluene, xylene, and like organic solvents that have a boiling point higher than that of water are more preferred; and toluene and like organic solvents that are azeotroped with water are particularly preferred because water can be efficiently removed from the system. Particularly, a mixture of a polar organic solvent and a nonpolar organic solvent is preferably used because the aforementioned advantages of both solvents can be achieved.

The temperature in the hydrolysis condensation reaction is 0 to 200° C., preferably 10 to 200° C., and more preferably 10 to 120° C. Although this reaction can be carried out at any pressure, the pressure is preferably in the range of 0.02 to 0.2 MPa, and more preferably in the range of 0.08 to 0.15 MPa. The reaction usually completes in about 1 to about 12 hours.

In the hydrolysis condensation reaction, condensation reaction proceeds with hydrolysis reaction. In terms of liquid stability and weather resistance, it is preferred that most of the hydrolyzable groups in the hydrolyzable silane (for example, Xs in the formula (IV)), and preferably 100% of the Xs, are hydrolyzed into hydroxy groups (OH groups); and that most of the OH groups, preferably 80% or higher, more preferably 90% or higher, and even more preferably 100% of the OH groups, are condensed.

After the hydrolysis condensation reaction, the solvent, alcohol produced by the reaction, and catalyst may be removed from the mixture by a known technique. The obtained product may be further purified by removing the catalyst using various purification methods (e.g., washing, column separation, and solid absorbent), depending on the purpose. Preferably, in terms of efficiency, the catalyst is removed by washing with water.

The silsesquioxane compound (a) of the present invention is produced by the above-described production method.

When not all of the OH groups are condensed in the hydrolysis condensation reaction, the product obtained by the production method of the present invention may contain, other than the silsesquioxane compound having a structure in which all of the Si—OH (hydroxysilyl) groups have been subjected to hydrolysis condensation reaction, silsesquioxane compounds having a rudder structure, an incomplete cage structure, and/or a random structure, in which the Si—OH groups remain. The silsesquioxane compound (a) of the present invention obtained by the aforementioned production method may contain such compounds having a rudder structure, an incomplete cage structure, and/or a random structure.

Production Method B

For example, the production method B comprises step B1 of producing an epoxy-containing silsesquioxane compound using an epoxy-containing hydrolyzable silane, step B2 of reacting the carboxy of a carboxy-containing compound with the epoxy contained in the silsesquioxane compound obtained in step B1, thereby producing a secondary hydroxy-containing silsesquioxane compound, and step B3 of reacting the isocyanate of a compound having (meth)acryloyloxy and isocyanate with the secondary hydroxy in the silsesquioxane compound obtained in step B2.

Step B1

Examples of the epoxy-containing hydrolyzable silane used in step B1 include hydrolyzable silanes represented by the formula (XVI) or (XVII) below.

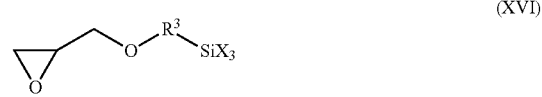

(XVI)

(XVII)

In the formulae (XVI) and (XVII), $R^3$ and X are as defined above. In step B1, an epoxy-containing silsesquioxane compound is specifically obtained as follows:

[3] The hydrolyzable silanes represented by the formula (XVI) and/or the formula (XVII) are used as starting materials, and subjected to hydrolysis condensation reaction in the presence of a catalyst; or

[4] The hydrolyzable silanes represented by the formula (XVI) and/or the formula (XVII), and hydrolyzable silanes other than those having an epoxy group are used as starting materials, and subjected to hydrolysis condensation reaction in the presence of a catalyst.

Hydrolyzable silanes other than the aforementioned epoxy-containing hydrolyzable silanes are not particularly limited as long as they are capable of producing a silsesquioxane compound through hydrolysis condensation reaction with an epoxy-containing hydrolyzable silane. Specific examples thereof include alkyltrialkoxysilanes such as methyltrimethoxysilane, methyltriethoxysilane, ethyltrimethoxysilane, ethyltriethoxysilane; 3-(meth)acryloyloxypropyl trialkoxysilanes such as 3-(meth)acryloyloxypropyl trimethoxysilane and 3-(meth)acryloyloxypropyl triethoxysilane; vinyltrialkoxysilanes such as vinyltrimethoxysilane and vinyltriethoxysilane; and the like.

As the catalyst, a basic catalyst is preferably used. Specific examples of the basic catalyst include alkali metal hydroxides such as potassium hydroxide, sodium hydroxide, and cesium hydroxide; ammonium hydroxide salts such as tetramethylammonium hydroxide, tetraethylammonium hydroxide, tetrabutylammonium hydroxide, and benzyl trimethylammonium hydroxide; ammonium fluoride salts such as tetrabutylammonium fluoride; and the like.

Although the amount of the catalyst used is not limited, using an overly large amount of the catalyst results in high costs and difficulties in removing the catalyst, while using an overly small amount of the catalyst slows the reaction. Therefore, the amount of the catalyst used is preferably 0.0001 to 1.0 mol, and more preferably 0.0005 to 0.1 mol, per mol of the hydrolyzable silane.

When the hydrolysis condensation reaction is carried out (the above process [3] or [4]), water is used. The proportion of the hydrolyzable silane and water is not particularly limited. The amount of water used is preferably 0.1 to 100 mol, and more preferably 0.5 to 3 mol, per mol of the hydrolyzable silane. When the amount of water is too low, the reaction proceeds slowly, possibly resulting in a reduced yield of the target silsesquioxane. Conversely, when the amount of water is too high, the molecular weight of the resulting product is increased, possibly resulting in a reduced amount of a product having the desired structure. Moreover, when a basic catalyst is used in the form of an aqueous solution, the water used in the reaction may be substituted by the solution, or water may be further added.

In the above hydrolysis condensation reaction, an organic solvent may or may not be used. The use of an organic solvent is preferred in terms of preventing gelation and controlling viscosity during production. As the organic solvent, a polar organic solvent and a nonpolar organic solvent may be used alone, or as a mixture thereof.

Examples of the polar organic solvent include lower alcohols such as methanol, ethanol, and 2-propanol; ketones such as acetone and methyl isobutyl ketone; and ethers such as tetrahydrofuran. Particularly, acetone and tetrahydrofuran are preferred because they have a low boiling point, and the use thereof results in a homogeneous system and improved reactivity. Preferred examples of the nonpolar organic solvent include hydrocarbon-based solvents; toluene, xylene, and like organic solvents that have a boiling point higher than that of water are more preferred; and toluene and like organic solvents that are azeotroped with water are particularly preferred because water can be efficiently removed from the system. Particularly, a mixture of a polar organic solvent and a nonpolar organic solvent is preferably used as a mixture solvent because the aforementioned advantages of both solvents can be achieved.

The reaction temperature in the hydrolysis condensation reaction is 0 to 200° C., preferably 10 to 200° C., and more preferably 10 to 120° C. The reaction usually completes in about 1 to about 12 hours.

In the hydrolysis condensation reaction, condensation reaction proceeds with hydrolysis reaction. In terms of liquid stability, it is preferred that most of the Xs in the formulae (XVI) or (XVII), and preferably 100% of the Xs, are hydrolyzed into hydroxy (OH) groups, and that most of the OH groups, preferably 80% or higher, more preferably 90% or higher, and even more preferably 100% of the OH groups, are condensed.

Step B2

In step B2, a silsesquioxane compound that has one or more organic groups represented by the formula (XX) below as organic groups each directly bonded to a silicon atom is produced by reacting a compound represented by the formula (XIX) below with the silsesquioxane compound obtained in step B1 that has one or more organic groups represented by the formula (XVIII) below as organic groups each directly bonded to a silicon atom.

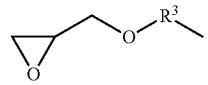

(XVIII)

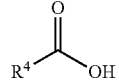

(XIX)

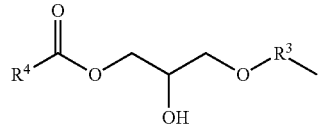

(XX)

In the formulae (XVIII), (XIX), and (XX), $R^3$ and $R^4$ are as defined above. As another example, a silsesquioxane compound that has one or more organic groups represented by the formula (XXIII) as organic groups each directly bonded to a silicon atom is produced by reacting a compound represented by the formula (XXII) with the silsesquioxane compound obtained in step B1 that has one or more organic groups represented by the formula (XXI) as organic groups each directly bonded to a silicon atom.

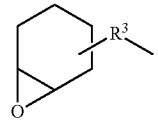

(XXI)

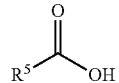

(XXII)

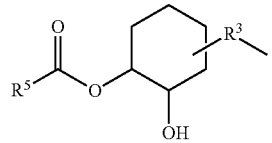

(XXIII)

In the formulae (XXI), (XXII), and (XXIII), $R^3$ and $R^5$ are as defined above.

The reaction for producing the silsesquioxane compound that has one or more organic groups represented by the formula (XX) as organic groups each directly bonded to a silicon atom, and the reaction for producing the silsesquioxane compound that has one or more organic groups represented by the formula (XXIII) as organic groups each directly bonded to a silicon atom can be carried out according to an ordinary method of reacting epoxy and carboxy.

The reaction temperature is 0 to 200° C., preferably 20 to 200° C., and more preferably 20 to 120° C. The reaction usually completes in about 10 to about 24 hours.

In the above reaction, the proportion of the compound represented by the formula (XIX) and the silsesquioxane compound that includes one or more organic groups represented by the formula (XVIII) is such that the compound represented by the formula (XIX) is contained in an amount of about 0.80 to about 1.20 mol, and preferably about 0.90 to about 1.10 mol, per mol of the organic group represented by the formula (XVIII) in the silsesquioxane compound.

In the above reaction, the proportion of the compound represented by the formula (XXII) and the silsesquioxane compound including the organic group represented by the formula (XXI) is such that the compound represented by the formula (XXII) is contained in an amount of about 0.80 to about 1.20 mol, and preferably about 0.80 to about 1.20 mol, per mol of the organic group represented by the formula (XXI) in the silsesquioxane compound.

In the reaction, a catalyst may be suitably used. Specific examples of the catalyst include tertiary amines such as triethylamine and benzyldimethylamine; quaternary ammonium salts such as tetramethylammonium chloride, tetraethylammonium bromide, and tetrabutylammonium bromide; secondary amine salts such as acetate and formate of diethylamine; alkali metal or alkaline earth metal hydroxides such as sodium hydroxide and calcium hydroxide; alkali metal or alkaline earth metal salts such as sodium acetate and calcium acetate; imidazoles; cyclic nitrogen-containing compounds such as diazabicycloundecene; phosphorus compounds such as triphenylphosphine and tributylphosphine; and the like. The amount of the catalyst used is not limited, but is specifically, for example, 0.01 to 5 mass % based on the amount of the reaction starting material.

In the reaction, a solvent may be suitably used. The solvent is not particularly limited, and examples thereof include acetone, methyl ethyl ketone, methyl isobutyl ketone, cyclohexanone, methyl amyl ketone, ethyl isoamyl ketone, diisobutyl ketone, methyl hexyl ketone, and like ketones; ethyl acetate, butyl acetate, methyl benzoate, methyl propionate, and like esters; tetrahydrofuran, dioxane, dimethoxyethane, and like ethers; ethylene glycol monomethyl ether, ethylene glycol monoethyl ether, diethylene glycol monomethyl ether, propylene glycol monomethyl ether acetate, 3-methoxy butyl acetate, and like glycol ethers; toluene, xylene, and like aromatic hydrocarbons; aliphatic hydrocarbons; and the like.

Step B3

In step B3, a compound represented by the formula (XXIV) below is reacted with the silsesquioxane compound obtained in step B2 that has one or more organic groups represented by the formula (XX) as organic groups each directly bonded to a silicon atom.

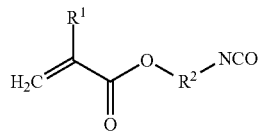

(XXIV)

In the formula (XXIV), $R^1$ and $R^2$ are as defined above. By this reaction, the silsesquioxane compound that has one or more organic groups represented by the formula (II) as organic groups each directly bonded to a silicon atom can be obtained.

As another example, the compound represented by the formula (XXV) below is reacted with the silsesquioxane compound obtained in step B2 that has one or more organic groups represented by the formula (XXIII) as organic groups each directly bonded to a silicon atom.

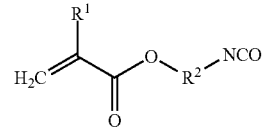

(XXV)

In the formula (XXV), $R^1$ and $R^2$ are as defined above. By this reaction, a silsesquioxane compound having one or more organic groups represented by the formula (III) as organic groups each directly bonded to a silicon atom can be obtained.

The reaction can be carried out according to an ordinary method of reacting hydroxy and isocyanate. The reaction temperature is 0 to 200° C., preferably 10 to 200° C., and more preferably 10 to 120° C. The reaction usually completes in about 2 to about 10 hours.

In the reaction, the proportion of the compound represented by the formula (XXIV) and the silsesquioxane compound including one or more organic groups represented by the formula (XX) is such that the compound represented by the formula (XXIV) is contained in an amount of about 0.90 to about 1.10 mol, and preferably about 0.95 to about 1.05 mol, per mol of the organic group represented by the formula (XX) in the silsesquioxane compound.

In the reaction, the proportion of the compound represented by the formula (XXV) and the silsesquioxane compound including one or more organic groups represented by the formula (XXIII) is such that the compound represented by the formula (XXV) is contained in an amount of about 0.90 to about 1.10 mol, and preferably about 0.95 to about 1.05 mol, per mol of the organic group represented by the formula (XXIII) in the silsesquioxane compound.

In the reaction, a catalyst may be suitably used. Examples of the catalyst include tertiary amines such as triethylamine; organic metal compounds such as dibutyltin dilaurate; and the like.

The silsesquioxane compound (a) of the present invention can be produced according to the production method described above.

The target compound obtained by the aforementioned reaction is separated from the reaction system by general separation means, and can be further purified. Separation and purification are performed, for example, by way of evaporation, solvent extraction, dilution, recrystallization, column chromatography, ion-exchange chromatography, gel chromatography, affinity chromatography, and the like.

When not all of the OH groups are condensed in the hydrolysis condensation reaction in step B1, the product obtained by the production method B may contain, other than a silsesquioxane compound having a structure in which all of the Si—OH groups (hydroxysilyl groups) are subjected to hydrolysis condensation reaction, silsesquioxane compounds having a rudder structure, an incomplete cage structure, and/or a random structure, in which the Si—OH groups remain.

The silsesquioxane compound (a) obtained by the production method B may contain such compounds having a rudder structure, an incomplete cage structure, and/or a random structure.

(b) Photoinitiator

The photoinitiator (b) is not particularly limited, as long as it absorbs an active energy ray and generates a radical.

Examples of the photoinitiator (b) include benzyl, diacetyl, and like α-diketone compounds; benzoin and like acyloin compounds; benzoin methyl ether, benzoin ethyl ether, benzoin isopropyl ether, and like acyloin ether compounds; thioxanthone, 2,4-diethylthioxanthone, 2-isopropylthioxanthone, thioxanthone-4-sulfonic acid, and like thioxanthone compounds; benzophenone, 4,4'-bis(dimethylamino)benzophenone, 4,4'-bis(diethylamino)benzophenone, and like benzophenone compounds; Michler's ketone compounds; acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl[4-(methylthio)phenyl]-2-morpholino-1-propanone, 2-benzyl-2-dimethylamino-1-(4-morpholinophenyl)-butan-1-one, α-isohydroxy isobutylphenone, α,α'-dichloro-4-phenoxyacetophenone, 1-hydroxy-cyclohexyl-phenyl-ketone, and like acetophenone compounds; 2,4,6-trimethylbenzoyldiphenylphosphine oxide, bis(acyl)phosphine oxide, and like acylphosphine oxide compounds; anthraquinone, 1,4-naphthoquinone, and like quinone compounds; phenacyl chloride, trihalomethylphenylsulfone, tris(trihalomethyl)-s-triazine, and like halogenated compounds; di-t-butyl peroxide, and like peroxide compounds; etc. These may be used singly, or in a combination of two or more.

Examples of commercially available photoinitiators (b) include Irgacure 184, Irgacure 127, Irgacure 261, Irgacure 500, Irgacure 651, Irgacure 819, Irgacure 907, and Irgacure CGI 1700 (trade names, produced by BASF); Darocur 1173, Darocur 1116, Darocur 2959, Darocur 1664, Darocur 4043 (trade names, produced by Merck Japan Ltd.); Kayacure-MBP, Kayacure-DETX-S, Kayacure-DMBI, Kayacure-EPA, Kayacure-OA (trade names, produced by Nippon Kayaku Co., Ltd.); Vicure 10, Vicure 55 (trade names, produced by Stauffer Co., Ltd.); Trigonal P1 (trade name, produced by Akzo Co., Ltd.); Sandoray 1000 (trade name, produced by Sandoz Co., Ltd.); Deap (trade name, produced by Apjohn Co., Ltd.); Quantacure PDO, Quantacure ITX, Quantacure EPD (trade names, produced by Ward Blenkinsop Co., Ltd.); Esacure KIP 150, Esacure ONE (trade names, produced by Lamberti S.p.A.); Lucirin TPO; etc.

From the viewpoint of photocurability, the photoinitiator (b) preferably comprises at least one of thioxanthone compounds, acetophenone compounds, and acyl phosphine oxide compounds, or a mixture thereof. Of these, it is particularly preferable that the photoinitiator (b) comprises a mixture of acetophenone compounds and acyl phosphine oxide compounds.

The ratio of the amount of the silsesquioxane compound (a) of the present invention to the amount of the photoinitiator (b) is not particularly limited. The photoinitiator (b) is generally used in an amount of 1 to 20 parts by mass, preferably 2 to 10 parts by mass, per 100 parts by mass of the nonvolatile matter of the silsesquioxane compound (a).

The active energy ray-curable top coating composition (II) used in the present invention essentially contains the aforementioned (a) and (b) components, and optionally contains a polymerizable unsaturated compound (c) other than the (a) component.

The polymerizable unsaturated compound (c) is not particularly limited, as long as the polymerizable unsaturated compound (c) is a compound other than the silsesquioxane compound of the present invention and has at least one polymerizable unsaturated double bond in its chemical structure.

Examples of the polymerizable unsaturated compound (c) include esterified products of a monohydric alcohol and (meth)acrylic acid, and the like. Specific examples thereof include methyl(meth)acrylate, ethyl(meth)acrylate, n-propyl (meth)acrylate, isopropyl(meth)acrylate, n-butyl(meth)acrylate, isobutyl(meth)acrylate, t-butyl(meth)acrylate, neopentyl(meth)acrylate, cyclohexyl(meth)acrylate, tetrahydrofurfuryl(meth)acrylate, isobornyl(meth)acrylate, phenyl(meth)acrylate, benzyl(meth)acrylate, N-acryloyloxyethyl hexahydrophthalimide, and the like. Other examples of the polymerizable unsaturated compound include esterified products of a polyhydric alcohol and (meth)acrylic acid. Specific examples thereof include ethylene glycol di(meth)acrylate, diethylene glycol di(meth)acrylate, triethylene glycol di(meth)acrylate, tetraethylene glycol di(meth)acrylate, 1,3-butanediol di(meth)acrylate, 1,4-butanediol di(meth)acrylate, 1,9-nonanediol di(meth)acrylate, glycerin di(meth)acrylate, trimethylolpropane di(meth)acrylate, pentaerythritol di(meth)acrylate, neopentyl glycol di(meth)acrylate, 1,6-hexanediol di(meth)acrylate, pentaerythritol di(meth)acrylate, bisphenol A ethylene oxide-modified di(meth)acrylate, and like di(meth)acrylate compounds; glycerin tri(meth)acrylate, trimethylolpropane tri(meth)acrylate, trimethylolpropane propylene oxide-modified tri(meth)acrylate, trimethylolpropane ethylene oxide-modified tri(meth)acrylate, pentaerythritol tri(meth)acrylate, tris(2-acryloyloxyethyl)isocyanurate, tris(2-acryloyloxypropyl)isocyanurate, ε-caprolactone-modified tris(acryloxyethyl)isocyanurate, a reaction product of equimolar hydroxyalkyl(meth)acrylate and isocyanurate ring adduct of 1,6-hexamethylene diisocyanate, a reaction product of equimolar hydroxyalkyl (meth)acrylate and isocyanurate ring adduct of hexamethylene diisocyanate having imino oxadiazine dione, and like tri(meth)acrylate compounds; pentaerythritol tetra(meth)acrylate, and like tetra(meth)acrylate compounds; and dipentaerythritol penta(meth)acrylate, dipentaerythritol hexa(meth)acrylate, etc. Examples thereof further include urethane(meth)acrylate, epoxy(meth)acrylate, polyester(meth)acrylate, and the like. Urethane (meth)acrylate can be obtained by, for example, using a polyisocyanate compound, hydroxyalkyl(meth)acrylate, and a polyol compound as starting materials, and carrying out a reaction in such a manner that hydroxy is used in an equimolar or excess amount based on the amount of isocyanate. The polymerizable unsaturated compounds can be used singly, or in a combination of two or more.

When used, the amount of the polymerizable unsaturated compound (c) is not particularly limited. From the viewpoint of the properties of the formed coating film, the amount of the polymerizable unsaturated compound is preferably 0.1 to 1,000 parts by mass, and more preferably 1 to 200 parts by mass, per 100 parts by mass of the nonvolatile matter of the silsesquioxane compound (a).

The active energy ray-curable top coating composition (II) used in the present invention may optionally contain colloidal silica so as to improve scratch resistance and abrasion resistance. Colloidal silica generally refers to a dispersion of ultrafine particles of silicic anhydride having a primary particle diameter of 1 to 200 μm dispersed in water or an organic solvent. Such colloidal silica may be treated with a hydrolyzable silane compound, a polymerizable silane compound, or the like.

The amount of the colloidal silica is not particularly limited; colloidal silica is preferably contained in an amount of 1 to 60 parts by mass, more preferably 5 to 30 parts by mass, per 100 parts by mass of nonvolatile matter of the silsesquioxane compound (a) so as to improve scratch resistance and abrasion resistance, and to prevent occurrence of cracking of the formed coating film.

The active energy ray-curable top coating composition (II) used in the present invention may further optionally contain various additives, saturated resin, etc. Additionally, the active energy ray-curable top coating composition (II) may contain a solvent as desired, or may be diluted with this solvent. Examples of additives include sensitizers, UV absorbers, light stabilizers, polymerization inhibitors, antioxidants, defoaming agents, surface control agents, plasticizers, coloring agents, and the like. Examples of saturated resins include saturated acrylic resins, saturated polyester resins, saturated urethane resins, and the like. UV absorbers and light stabilizers may be appropriately selected from those listed in the description regarding the undercoating composition (I) above.

Examples of solvents that can be used for dilution include acetone, methyl ethyl ketone, methyl isobutyl ketone, and like ketone compounds; ethyl acetate, butyl acetate, methyl benzoate, methyl propionate, and like ester compounds; tetrahydrofuran, dioxane, dimethoxyethane, and like ether compounds; ethylene glycol monomethyl ether, ethylene glycol monoethyl ether, diethylene glycol monomethyl ether, propylene glycol monomethyl ether acetate, 3-methoxybutyl acetate, and like glycol ether compounds; and aromatic hydrocarbon compounds, aliphatic hydrocarbon compounds, etc. These can suitably be used in combination according to the purpose, such as adjustment of viscosity or application properties.

The nonvolatile matter content of the active energy ray-curable coating composition (II) is not particularly limited. It is preferably, for example, 20 to 90 mass, and more preferably 25 to 70 mass. The above-mentioned amount range is significant in terms of the smoothness of the formed coating film and reduction in drying time.

Method for Forming a Multi-Layered Coating Film

The method for forming a multi-layered coating film of the present invention comprises the steps of: forming an undercoating film on a substrate using at least one undercoating composition (I) selected from the group consisting of the aforementioned active energy ray-curable undercoating composition (Ia), photo- and heat-curable undercoating composition (Ib), and room temperature- or heat-curable undercoating composition (Ic); and forming a top coating film on the undercoating film after the formation of the undercoating film, the top coating film being formed using the aforementioned active energy ray-curable top coating composition (II).

Substrate

The substrate used in the method of the present invention is not particularly limited. Examples thereof include iron, aluminium, brass, copper, stainless steel, tin plate, galvanized steel, zinc alloy (Zn—Al, Zn—Ni, Zn—Fe, or the like)—plated steel, and like metal materials; polyethylene resin, polypropylene resin, acrylonitrile-butadiene-styrene (ABS) resin, polyamide resin, acrylic resin, vinylidene chloride resin, polycarbonate resin, polyurethane resin, epoxy resin, and like resins and various plastic materials such as FRPs; glass, cement, concrete, and like inorganic materials; wood; fiber materials (paper, cloth, etc.); and the like. Of these, plastic materials are preferable, with polycarbonate resin being particularly preferable.

The usage of the coated articles obtained by the method of the present invention is not particularly limited. Examples thereof include exterior body panels of vehicles, such as cars, trucks, motorbikes, and buses; automobile parts; exterior panels of home electric appliances, such as mobile phones and audio equipment; and the like. Among these, vehicle body exterior panels and automobile parts are preferable.

(1) Undercoating Film Forming Step

Methods for forming an undercoating film on an aforementioned substrate using the undercoating composition (I), i.e., methods for applying the undercoating composition (I), are not particularly limited. Examples thereof include roller coating, roll coater coating, spin coater coating, curtain roll coater coating, slit coater coating, spray coating, electrostatic coating, dip coating, silk printing, spin coating, and the like.

The film thickness of the undercoating film is suitably determined according to the purpose. For example, when an active energy ray-curable undercoating composition (Ia) is used as the undercoating composition (I), the film thickness is preferably 3 to 30 µm, and more preferably 5 to 15 µm. When a photo- and heat-curable undercoating composition (Ib) is used as the undercoating composition (I), the film thickness is preferably 3 to 50 µm, and more preferably 5 to 40 µm. When a room temperature- or heat-curable undercoating composition (Ic) is used as the undercoating composition (I), the film thickness is preferably 3 to 50 µm, and more preferably 5 to 40 µm. From the viewpoint of the curability and application workability (prevention of sagging) of the undercoating film, the film thickness is preferably not less than the lower limit of the above-mentioned ranges. Further, from the viewpoint of the adhesion property of the undercoating film to a substrate after a weathering test, the film thickness is preferably not more than the upper limit of the above-mentioned ranges.

In a case where the active energy ray-curable undercoating composition (Ia) is used as the undercoating composition (I), drying may optionally be performed at the time of forming an undercoating film by using the active energy ray-curable undercoating composition (Ia). The drying is not particularly limited insofar as the solvent contained in the active energy ray-curable undercoating composition (Ia) can be removed. For example, drying may be performed at a drying temperature of 20 to 100° C. for a drying time of 3 to 20 minutes.

After the undercoating film is optionally dried as described above, active energy ray radiation may be performed to form a cured coating film, or the top coating composition of the next step may be applied thereto while the film remains uncured. The radiation source and radiation dose of the active energy ray radiation are not particularly limited. Examples of radiation sources of an active energy ray include an extra-high-pressure mercury-vapor lamp, a high-pressure mercury-vapor lamp, a medium-pressure mercury-vapor lamp, a low-pressure mercury-vapor lamp, a chemical lamp, a carbon arc light, a xenon light, a metal halide light, a fluorescent light, a tungsten light, sunlight, and the like. The radiation dose is preferably, for example, within a range of from 100 to 5,000 mJ/cm$^2$, and more preferably within a range of from 300 to 30,000 mJ/cm$^2$. From the viewpoint of the adhesion of the undercoating film to the top coating film, the radiation dose is preferably not more than 5,000 mJ/cm$^2$.

The active energy ray radiation may be performed in open air, or in an inert gas atmosphere. Examples of inert gases include nitrogen, carbon dioxide, and the like. The active energy ray radiation is preferably performed in open air from the viewpoint of the adhesion to the top coating film.

In a case where the photo- and heat-curable undercoating composition (Ib) is used as the undercoating composition (I), preliminary heating (preheating), air blowing, or the like, can be performed at the time of forming an undercoating film by using the photo- and heat-curable undercoating composition (Ib) so as to reduce or remove the volatile matter from the coating film immediately after the application. Preheating can usually be performed by directly or indirectly heating a coated substrate in a drying furnace at 50 to 140° C., preferably 60 to 100° C., for 1 to 30 minutes. Air blowing can usually be performed by blowing air at ordinary temperature or air heated to 25 to 80° C. over the coated surface of a substrate.

After drying is optionally performed as described above, heating and active energy ray radiation may be performed to form a cured coating film, or only heating may be performed, followed by application of the top coating composition of the next step while the unsaturated groups remain unreacted.

When the coating film formed from the photo- and heat-curable undercoating composition (Ib) is cured, heating and active energy ray radiation are usually performed. The order of heating and active energy ray radiation is not particularly limited; active energy ray radiation may be performed after heating, heating may be performed after active energy ray radiation, or heating and active energy ray radiation may be performed at the same time. When heating and active energy ray radiation are performed at the same time, the heat source may be heat generated from the active energy ray radiation source (e.g., heat generated by a lamp). When active energy ray radiation is performed after heating, active energy ray radiation may be performed while the substrate has heat, i.e., while the substrate retains residual heat.

The heating conditions are not particularly limited. For example, heating may be performed at 50 to 140° C. for 1 to 30 minutes. Since the coating composition (Ib) exhibits curability at a low temperature, desirable properties, such as weather resistance, can be obtained without requiring high-temperature (e.g., 100° C. or more) heating. It is therefore preferable to perform heating at a temperature of 60 to 100° C. Further, since the coating composition (Ib) can be cured by active energy ray, desirable properties, such as weather resistance, can be obtained without requiring a long heating time. It is therefore preferable to perform heating for 1 to 30 minutes, and more preferably 1 to 20 minutes.

The radiation source and radiation dose of the active energy ray radiation are not particularly limited. Examples of radiation sources of an active energy ray include an extra-high-pressure mercury-vapor lamp, a high-pressure mercury-vapor lamp, a medium-pressure mercury-vapor lamp, a low-pressure mercury-vapor lamp, a chemical lamp, a carbon arc light, a xenon light, a metal halide light, a fluorescent light, a tungsten light, sunlight, and the like. The radiation dose is usually within a range of from 100 to 5,000 mJ/cm$^2$, and preferably within a range of from 300 to 3,000 mJ/cm$^2$. The radiation dose exceeding 5,000 mJ/cm$^2$ is not preferable because the adhesion property to the top coating film may be decreased.

The active energy ray radiation may be performed in open air, or in an inert gas atmosphere. Examples of inert gases include nitrogen, carbon dioxide, and the like. The active energy ray radiation is preferably performed in open air from the viewpoint of the adhesion to the top coating film.

In a case where the room temperature- or heat-curable undercoating composition (IC) is used as the undercoating composition (I), preliminary heating (preheating), air blowing, or the like, may be performed at the time of forming the undercoating film from the room temperature- or heat-curable undercoating composition (Ic) so as to reduce or remove the volatile matter from the coating film immediately after the application. Preheating can usually be performed by directly or indirectly heating a substrate, on which the room temperature- or heat-curable undercoating composition (Ic) was coated, in a drying furnace at 50 to 110° C., preferably 60 to 90° C., for 1 to 30 minutes. Air blowing can usually be performed by blowing air at ordinary temperature or air heated to 25 to 80° C. over the coated surface of a substrate.

After drying is optionally performed as described above, heating may be performed to form a cured coating film, or the top coating composition of the next step may be applied to the film when the film is dried/uncured.

The heat conditions for curing the coating film of the room temperature- or heat-curable undercoating composition (IC) are not particularly limited. For example, heating may be performed at 50 to 140° C. for 1 to 60 minutes.

(2) Top Coating Film Forming Step

Methods for forming the top coating film on the undercoating film formed as described the above, using the active energy ray-curable top coating composition (II), i.e., methods for applying the active energy ray-curable top coating composition (II), are not particularly limited. Examples thereof include roller coating, roll coater coating, spin coater coating, curtain roll coater coating, slit coater coating, spray coating, electrostatic coating, dip coating, silk printing, spin coating, and the like.

When the active energy ray-curable top coating composition (II) is used to form a coating film, drying may be performed, if necessary. The drying conditions are not particularly limited insofar as the solvent contained therein can be removed. For example, drying may be performed at a drying temperature of 20 to 100° C. for a drying time of 3 to 20 minutes.

The film thickness of the top coating film is suitably determined according to the purpose. The film thickness is preferably 1 to 15 μm, and more preferably 2 to 10 μm. From the viewpoint of the weather resistance (in particular, cracking) of the resulting multi-layered coating film, the film thickness is preferably not less than the lower limit of this range. Further, from the viewpoint of the curability of the coating film, the film thickness is preferably not more than the upper limit of this range.

After the top coating film is optionally dried as described above, active energy ray radiation is performed to form a cured coating film. The radiation source and radiation dose of active energy ray are not particularly limited. Examples of radiation sources of an active energy ray include an extra-high-pressure mercury-vapor lamp, a high-pressure mercury-vapor lamp, a medium-pressure mercury-vapor lamp, a low-pressure mercury-vapor lamp, a chemical lamp, a carbon arc light, a xenon light, a metal halide light, a fluorescent light, a tungsten light, sunlight, and the like. The radiation dose is, for example, preferably within a range of from 100 to 10,000 mJ/cm$^2$, and more preferably within a range of from 500 to 5,000 mJ/cm$^2$.

The active energy ray radiation may be performed in open air or in an inert gas atmosphere. Examples of inert gases include nitrogen, carbon dioxide, and the like. The active energy ray radiation is preferably performed in an inert gas atmosphere from the viewpoint of the curability.

After active energy ray radiation, the coating film may be heated, if necessary. The heating can alleviate the deformation of the coating film caused as a result of curing by active energy ray radiation. The heating may also improve the hardness or adhesion properties of the resulting coating film. The heating can generally be performed at an ambient temperature of 80 to 150° C. for 1 to 30 minutes.

EXAMPLES

The present invention is described in more detail below with reference to Examples. The phrases "parts" and "%"

mean "parts by mass" and "% by mass," respectively, unless otherwise stated separately. The structural analysis and measurement in the Production Examples were conducted using the following analysis equipment and measuring method, in addition to the analysis equipment mentioned above in this specification.
$^{29}$Si-NMR analysis and $^1$H-NMR analysis
   Equipment: FT-NMR EX-400, produced by JEOL
   Solvent: CDCl$_3$
   Internal standard substance: tetramethylsilane
FT-IR Analysis
   Equipment: FT/IR-610, produced by JASCO Corporation
SP Value Measurement Method
   The SP value used in the Examples is a solubility parameter that can be measured by a simple measurement method (turbidimetric titration), and the value is calculated according to the following formula suggested by K. W. Suh and J. M. Corbett (see the description of Journal of Applied Polymer Science, 12, 2359, 1968).

Formula: $SP=(\sqrt{Vml}\cdot\delta H+\sqrt{Vmh}\cdot\delta D)/(\sqrt{Vml}+\sqrt{Vmh})$ In turbidimetric titration, n-hexane is gradually added to a solution of 0.5 g of a sample dissolved in 10 mL of acetone, and the titration amount H (mL) at the turbidity point is read. Similarly, deionized water is added to an acetone solution, and the titration amount D (mL) at the turbidity point is read. These values are applied to the following formulae to determine Vml, Vmh, δH, and δD. The molecular volume (mol/mL) of each solvent is as follows: acetone: 74.4, n-hexane: 130.3, and deionized water: 18. SP of each solvent is as follows: acetone: 9.75, n-hexane: 7.24, and deionized water: 23.43.

$Vml=74.4\times130.3/((1-VH)\times130.3+VH\times74.4)$ $Vmh=74.4\times18/((1-VD)\times18+VD\times74.4)$ $VH=H/(10+H)$ $VD=D/(10+D)$ $\delta H=9.75\times10/(10+H)+7.24\times H/(10+H)$ $\delta D=9.75\times10/(10+D)+23.43\times D/(10+D)$ Production of Silsesquioxane Compound (a)

Production Example 1

685 parts of 3-isocyanatepropyltriethoxysilane, 315 parts of 2-hydroxyethyl acrylate, 1 part of p-methoxyphenol were placed in a separable flask equipped with a reflux condenser, a thermometer, an air inlet tube, and a stirrer, and the mixture was reacted at 100° C. for 12 hours while blowing dry air thereinto, thereby obtaining a product (P1). Subsequently, 728 parts of the product (P1) and 2,800 parts of tetrahydrofuran were placed in a separable flask equipped with a reflux condenser, a thermometer, and a stirrer, and the mixture was stirred at ordinary temperature. 4 parts of tetrabutylammonium fluoride trihydrate was dissolved in 54 parts of deionized water, and the mixture was introduced into the flask and reacted at 20° C. for 24 hours. 500 parts of 1-methoxy-2-propanol was added thereto, and volatile matter was removed by vacuum distillation. Thereafter, 500 parts of 1-methoxy-2-propanol was further added thereto, vacuum distillation was carried out, and the solvent was exchanged. The product was adjusted to 1,000 parts, thereby obtaining 1,000 parts of a solution of a product (P2) having a nonvolatile matter of 50%.

As a result of $^{29}$Si—NMR analysis of the product (P2), only a peak derived from a T3 structure, in which all of three oxygen atoms attached to Si were attached to other Si, was observed at about –70 ppm, and no peak derived from a T0, T1, or T2 structure was observed.

Further, as a result of $^1$H-NMR analysis of the product (P2), a peak derived from a methylene group attached to Si was observed at 0.6 ppm. In addition, peaks derived from the carbon-carbon unsaturated bond of an acryloyloxy group were observed at 5.9 ppm, 6.1 ppm, and 6.4 ppm. Calculations based on the intensity ratio of these peaks showed that the molar ratio of the carbon-carbon unsaturated bond of the acryloyloxy group to the methylene group attached to Si was 1.01.

As a result of FT-IR analysis of the product (P2), a peak belonging to a urethane bond was observed at about 1540 cm$^{-1}$.

Further, as a result of gel permeation chromatography (GPC) analysis of the product (P2), the weight average molecular weight was 2,500.

The results of the $^{29}$Si—NMR, $^1$H-NMR, FT-IR, and GPC analyses of the product (P2) confirm that the product (P2) was a silsesquioxane compound comprising organic groups each directly attached to a silicon atom, each of the organic groups being represented by Formula (XXVI) below:

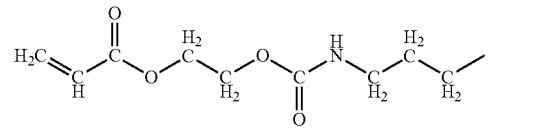

(XXVI)

wherein the silsesquioxane compound has a weight average molecular weight of 2,500 and a structure in which almost all of the Si—OH groups are hydrolyzed and condensed. The obtained silsesquioxane compound had an SP value of 10.7.

Production Example 2

646 parts of 3-isocyanatepropyltriethoxysilane, 363 parts of 4-hydroxybutylacrylate, and 1 part of p-methoxyphenol were placed in a separable flask equipped with a reflux condenser, a thermometer, an air inlet tube, and a stirrer, and the mixture was reacted at 100° C. for 12 hours while blowing dry air thereinto, thereby obtaining a product (P3). Subsequently, 706 parts of the product (P3) and 2,800 parts of tetrahydrofuran were placed in a separable flask equipped with a reflux condenser, a thermometer, and a stirrer, and the mixture was stirred at ordinary temperature. 4 parts of tetrabutylammonium fluoride trihydrate was dissolved in 48 parts of deionized water, and the mixture was introduced into the flask and reacted at 20° C. for 24 hours. 500 parts of 1-methoxy-2-propanol was added thereto, and volatile matter was removed by vacuum distillation. Thereafter, 500 parts of 1-methoxy-2-propanol was further added thereto, vacuum distillation was carried out, and the solvent was exchanged. The product was adjusted to 1,000 parts, thereby obtaining 1,000 parts of a solution of a product (P4) having a nonvolatile matter of 50%.

As a result of $^{29}$Si—NMR analysis of the product (P4), only a peak derived from a T3 structure, in which all of three oxygen atoms attached to Si were attached to other Si, was observed at about −70 ppm, and no peak derived from a T0, T1, or T2 structure was observed.

Further, as a result of $^1$H-NMR analysis of the product (P4), a peak derived from a methylene group attached to Si was observed at 0.6 ppm. In addition, peaks derived from the carbon-carbon unsaturated bond of an acryloyloxy group were observed at 5.9 ppm, 6.1 ppm, and 6.4 ppm. Calculations based on the intensity ratio of these peaks showed that the molar ratio of the carbon-carbon unsaturated bond of the acryloyloxy group to the methylene group attached to Si was 1.02.

As a result of FT-IR analysis of the product (P4), a peak belonging to a urethane bond was observed at about 1540 $cm^{-1}$.

Further, as a result of GPC analysis of the product (P4), the weight average molecular weight was 3,000.

The results of the $^{29}$Si—NMR, $^1$H-NMR, FT-IR, and GPC analyses of the product (P4) confirm that the product (P4) was a silsesquioxane compound comprising organic groups each directly attached to a silicon atom, each of the organic groups being represented by Formula (XXVII):

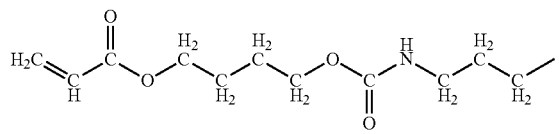

(XXVII)

wherein the silsesquioxane compound has a weight average molecular weight of 3,000 and a structure in which almost all of the Si—OH groups are hydrolyzed and condensed. The obtained silsesquioxane compound had an SP value of 10.5.

Production Example 3

246 parts of the product (P1), 470 parts of acryloxypropyltrimethoxysilane, and 2,800 parts of tetrahydrofuran were placed in a separable flask equipped with a reflux condenser, a thermometer, an air inlet tube, and a stirrer, and the mixture was stirred at ordinary temperature. 4 parts of tetrabutylammonium fluoride trihydrate was dissolved in 70 parts of deionized water, and the mixture was introduced into the flask and reacted at 20° C. for 24 hours while blowing dry air thereinto. 500 parts of 1-methoxy-2-propanol was added thereto, and volatile matter was removed by vacuum distillation. Thereafter, 500 parts of 1-methoxy-2-propanol was further added thereto, vacuum distillation was carried out, and the solvent was exchanged. The product was adjusted to 1,000 parts, thereby obtaining 1,000 parts of a solution of a product (P5) having a nonvolatile matter of 50%.

As a result of $^{29}$Si—NMR analysis of the product (P5), only a peak derived from a T3 structure, in which all of three oxygen atoms attached to Si were attached to other Si, was observed at about −70 ppm; and no peak derived from a T0, T1, or T2 structure was observed.

Further, as a result of $^1$H-NMR analysis of the product (P5), a peak derived from a methylene group attached to Si was observed at 0.6 ppm. In addition, peaks derived from the carbon-carbon unsaturated bond of an acryloyloxy group were observed at 5.9 ppm, 6.1 ppm, and 6.4 ppm. Calculations based on the intensity ratio of these peaks showed that the molar ratio of the carbon-carbon unsaturated bond of the acryloyloxy group to the methylene group attached to Si was 1.01.

As a result of FT-IR analysis of the product (P5), a peak belonging to a urethane bond was observed at about 1540 $cm^{-1}$.

Further, as a result of gel permeation chromatography (GPC) analysis of the product (P5), the weight average molecular weight was 2,000.

The results of the $^{29}$Si—NMR, $^1$H-NMR, FT-IR, and GPC analyses of the product (P5) confirm that the product (P5) was a silsesquioxane compound comprising organic groups each directly attached to a silicon atom, 25 mol % of the organic groups being represented by Formula (XXVI) above, and the other 75 mol % of the organic groups being represented by Formula (XXIX) below:

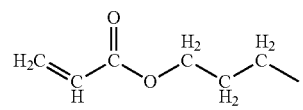

(XXIX)

wherein the silsesquioxane compound has a weight average molecular weight of 2,000, and a structure in which almost all of the Si—OH groups are hydrolyzed and condensed. The obtained silsesquioxane compound had an SP value of 10.4.

Production Example 4

100 parts of Glycidyl POSS Cage Mixture (trade name, produced by Hybrid Plastics) and 140 parts of butyl acetate were placed in a separable flask equipped with a reflux condenser, a thermometer, an air inlet tube, and a stirrer, and the mixture was stirred at 60° C. until dissolution was complete. Then, 40 parts of acetic acid, 0.5 parts of p-methoxyphenol, and 10 parts of tetrabutylammonium bromide were added thereto to carry out a reaction at 120° C. for 12 hours while blowing dry air thereinto. The resulting reaction product was cooled to 80° C., and 85 parts of 2-isocyanate ethyl acrylate was added thereto to carry out a reaction at 80° C. for 10 hours. Thereafter, volatile matter was removed by vacuum distillation, 500 g of 1-methoxy-2-propanol was further added thereto, and vacuum distillation was carried out, thereby obtaining a solution of a product (P6) having a nonvolatile matter of 50%.

The Glycidyl-POSS Cage Mixture used as a starting material was 3-glycidoxypropyl group-containing cage-type polysilsesquioxane having a weight average molecular weight of 1,800, and an epoxy equivalent of 168 g/eq.

As a result of $^1$Si—NMR analysis of the product (P6), only a peak derived from a T3 structure in which all of three oxygen atoms attached to Si were attached to other Si was observed at around −70 ppm, while no peak derived from a T1 or T2 structure indicating the presence of a hydroxysilyl group was observed.

Further, as a result of $^1$H-NMR analysis of the product (P6), a peak derived from a methylene group attached to Si was observed at 0.6 ppm. In addition, peaks derived from the carbon-carbon unsaturated bond of an acryloyloxy group were observed at 5.9 ppm, 6.1 ppm, and 6.4 ppm. Calculations based on the intensity ratio of these peaks showed that the molar ratio of the carbon-carbon unsaturated bond of the acryloyloxy group to the methylene group attached to Si was 1.00. A peak belonging to an epoxy group was not observed. The epoxy equivalent determined by titration was 10,000 g/eq or more.

As a result of FT-IR analysis of the product (P6), a broad peak belonging to a urethane bond, which was not observed in the Glycidyl POSS Cage Mixture (starting material), was observed at around 1540 cm$^{-1}$.

Further, as a result of GPC analysis of the product (P6), the weight average molecular weight was 4,000.

The results of the $^{29}$Si—NMR, $^1$H-NMR, FT-IR, and GPC analyses of the product (P6) demonstrated that the product (P6) was a silsesquioxane compound comprising organic groups each directly attached to a silicon atom, each of the organic groups being represented by Formula (XXVIII):

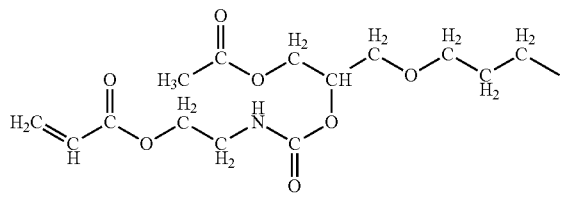

(XXVIII)

wherein the silsesquioxane compound comprises 55% or more of a silsesquioxane compound that has a weight average molecular weight of 4,000 and a structure in which all of the Si—OH groups are hydrolyzed and condensed. The obtained silsesquioxane compound had an SP value of 11.2.

Production of Unsaturated Acrylic Resin for Active Energy Ray-Curable Undercoating Composition (Ia)

Production Example 5

50 parts of 1-methoxy-2-propanol was placed in a glass reactor equipped with a heating device, a stirrer, a thermometer, an air inlet tube, and a reflux condenser tube, heated and stirred, and maintained at 100° C. Then, a mixture comprising 35 parts of methyl methacrylate, 30 parts of isobornyl acrylate, 20 parts of n-butyl methacrylate, 10 parts of glycidyl methacrylate, 2 parts of azobisisobutyronitrile, and 50 parts of 1-methoxy-2-propanol was added thereto dropwise over a period of 3 hours. After completion of dropwise addition, the resulting product was aged for 30 minutes at 100° C., and an additional catalyst mixed solution comprising 10 parts of 1-methoxy-2-propanol and 0.2 parts of azobisisobutyronitrile was added thereto dropwise over a period of 1 hour. The resulting mixture was aged at 100° C. for 5 hours to complete the polymerization. Thereafter, 0.05 parts of p-methoxyphenol and 5 parts of acrylic acid were added thereto, and a reaction was carried out for 6 hours while blowing dry air thereinto. Finally, 40 parts of 1-methoxy-2-propanol was added thereto, and the resulting mixture was cooled, thereby obtaining a solution of an unsaturated group-containing acrylic resin A having a nonvolatile matter of 40%. The unsaturated group-containing acrylic resin A had a weight average molecular weight of about 25,000.

Production Example 6

50 parts of 1-methoxy-2-propanol was placed in a glass reactor equipped with a heating device, a stirrer, a thermometer, an air inlet tube, and a reflux condenser tube, heated and stirred, and maintained at 100° C. Then, a mixture comprising 35 parts of methyl methacrylate, 20 parts of isobornyl acrylate, 20 parts of n-butyl methacrylate, 10 parts of glycidyl methacrylate, 10 parts of 2-(2'-hydroxy-5'-methacryloyloxyethylphenyl)-2H-benzotriazole, 2 parts of azobisisobutyronitrile, and 50 parts of 1-methoxy-2-propanol was added thereto dropwise over a period of 3 hours. After completion of dropwise addition, the resulting product was aged for 30 minutes at 100° C., and an additional catalyst mixed solution comprising 10 parts of 1-methoxy-2-propanol and 0.2 parts of azobisisobutyronitrile was added thereto dropwise over a period of 1 hour. The resulting mixture was aged at 100° C. for 5 hours to complete the polymerization. Thereafter, 0.05 parts of p-methoxyphenol and 5 parts of acrylic acid were added thereto, and a reaction was carried out for 6 hours while blowing dry air thereinto. Finally, 40 parts of 1-methoxy-2-propanol was added thereto, and the resulting mixture was cooled, thereby obtaining a solution of an unsaturated group-containing acrylic resin B having a nonvolatile matter of 40%. The unsaturated group-containing acrylic resin B had a weight average molecular weight of about 24,000.

Production Example 7

50 parts of 1-methoxy-2-propanol was placed in a glass reactor equipped with a heating device, a stirrer, a thermometer, an air inlet tube, and a reflux condenser tube, heated and stirred, and maintained at 100° C. Then, a mixture comprising 35 parts of methyl methacrylate, 18 parts of isobornyl acrylate, 20 parts of n-butyl methacrylate, 10 parts of glycidyl methacrylate, 10 parts of 2-(2'-hydroxy-5'-methacryloyloxyethylphenyl)-2H-benzotriazole, 2 parts of 4-methacryloyloxy-2,2,6,6-tetramethylpiperidine, 2 parts of azobisisobutyronitrile, and 50 parts of 1-methoxy-2-propanol was added thereto dropwise over a period of 3 hours. After completion of dropwise addition, the resulting product was aged for 30 minutes at 100° C., and an additional catalyst mixed solution comprising 10 parts of 1-methoxy-2-propanol and 0.2 parts of azobisisobutyronitrile was added thereto dropwise over a period of 1 hour. The resulting mixture was aged at 100° C. for 5 hours to complete the polymerization. Thereafter, 0.05 parts of p-methoxyphenol and 5 parts of acrylic acid were added thereto, and a reaction was carried out for 6 hours while blowing dry air thereinto. Finally, 40 parts of 1-methoxy-2-propanol was added thereto, and the resulting mixture was cooled, thereby obtaining a solution of an unsaturated group-containing acrylic resin C having a nonvolatile matter of 40%. The unsaturated group-containing acrylic resin C had a weight average molecular weight of about 24,000.

Production of Product (Ib) for Photo- and Heat-Curable Undercoating Composition (Ib)

Production Example 8

A mixture of 32.1 parts of butyl acetate, 50.0 parts of an isocyanurate ring adduct of hexamethylene diisocyanate (NCO content: 21%), 0.02 parts of dibutyltin dilaurate, and 0.2 parts of p-methoxyphenol was placed in a reactor equipped with a stirrer, a thermometer, a reflux condenser, an air inlet tube, and a dropping funnel. The mixture was heated to 50° C. while stirring. Then, while blowing dry air thereinto, 78.4 parts of PLACCEL FA-2D (trade name, produced by Daicel Chemical Industries, Ltd., caprolactone-modified hydroxyethyl acrylate) was added thereto dropwise over a period of 8 hours in such a manner that the temperature of the mixture did not exceed 60° C., and the mixture was stirred at 60° C. for another 1 hour. Thereby, a solution of a product (ib-1) having a nonvolatile matter of 80% was obtained. The obtained product (ib-1) had an isocyanate equivalent amount of 1,852, an unsaturated group equivalent amount of 564, and a weight average molecular weight of 1,297.

Production Examples 9 to 13

Solutions of products (ib-2) to (ib-6) were obtained in the same manner as described in Production Example 8, except that the amounts of the components used in Production Example 8 were changed as shown in Table 1. Table 1 shows the isocyanate equivalent amounts, unsaturated group equivalent amounts, and weight average molecular weights of the obtained products. (Note 1) PLACCEL FA-1: trade name, produced by Daicel Chemical Industries, Ltd., caprolactone-modified hydroxyethyl acrylate (Note 2) PLACCEL FM-3: trade name, produced by Daicel Chemical Industries, Ltd., caprolactone-modified hydroxyethyl methacrylate KOH/g, a hydroxy value of 96.6 mg KOH/g, and a weight average molecular weight of 20,000.

Production of Acrylic Resin for Room Temperature- or Heat-Curable Undercoating Composition (Ic)

Production Example 15

50 parts of 1-methoxy-2-propanol was placed in a glass reactor equipped with a heating device, a stirrer, a thermometer, and a reflux condenser tube, heated and stirred, and maintained at 100° C. Then, a mixture comprising 36 parts of methyl methacrylate, 30 parts of isobornyl acrylate, 10 parts of n-butyl methacrylate, 15 parts of KBM-503 (trade name, produced by Shin-Etsu Chemical Co., Ltd., γ-methacryloyloxypropyltrimethoxysilane), 8 parts of 2-(2'-hydroxy-5'-methacryloyloxyethylphenyl)-2H-benzotriazole, 1 part of 4-methacryloyloxy-2,2,6,6-tetramethylpiperidine, 2 parts of

TABLE 1

| | Production Example | | | | | |
|---|---|---|---|---|---|---|
| | 8 | 9 | 10 | 11 | 12 | 13 |
| Product | ib-1 | ib-2 | ib-3 | ib-4 | ib-5 | ib-6 |
| Butyl Acetate | 32.1 | 25.3 | 25.0 | 30.0 | 17.5 | 15.0 |
| Isocyanurate Ring Adduct of Hexamethylene Diisocyanate | 50.0 | 50.0 | 50.0 | 50.0 | 50.0 | 50.0 |
| Dibutyltin Dilaurate | 0.02 | 0.02 | 0.02 | 0.02 | 0.02 | 0.02 |
| Hydroquinone Monomethyl Ether | 0.2 | 0.2 | 0.2 | 0.2 | 0.2 | 0.2 |
| PLACCEL FA-2D | 78.4 | 51.1 | | | | |
| PLACCEL FA-1 (Note 1) | | | 50.1 | | | |
| PLACCEL FM-3 (Note 2) | | | | 70.2 | | |
| Hydroxyethyl Acrylate | | | | | 23.0 | 11.5 |
| Nonvolatile Matter (%) | 80 | 80 | 80 | 80 | 80 | 80 |
| Isocyanate Equivalent Amount | 1852 | 681 | 1264 | 808 | 816 | 350 |
| Unsaturated Group Equivalent Amount | 564 | 681 | 460 | 808 | 408 | 700 |
| Weight Average Molecular Weight | 1297 | 1021 | 11011 | 1213 | 816 | 700 |

Production of Hydroxy-Containing Resin for Photo- and Heat-Curable Undercoating Composition (Ib)

Production Example 14

80 parts of 1-methoxy-2-propanol was placed in a reaction vessel equipped with a stirrer, a thermometer, a reflux condenser, and a dropping funnel, and heated to 100° C. with stirring. Then, a mixture comprising 10 parts of styrene, 40 parts of methyl methacrylate, 8 parts of i-butyl methacrylate, 20 parts of n-butyl acrylate, 20 parts of 2-hydroxyethyl acrylate, 2 parts of acrylic acid, and 4 parts of 2,2'-azobisisobutyronitrile was added thereto dropwise at a constant rate over a period of 3 hours, and the resulting mixture was aged at the same temperature for another 2 hours. Thereafter, a mixture of 10 parts of 1-methoxy-2-propanol and 0.5 parts of 2,2'-azobisisobutyronitrile was further added to the reaction vessel dropwise over a period of 1 hour. After the completion of the dropwise addition, the mixture was aged for 1 hour, thereby obtaining a solution of a hydroxy-containing acrylic resin having a nonvolatile matter of 55%. The obtained hydroxy-containing acrylic resin had an acid value of 15.6 mg azobisisobutyronitrile, and 50 parts of 1-methoxy-2-propanol was added thereto dropwise over a period of 3 hours. After completion of the dropwise addition, the resulting mixture was aged at 100° C. for 30 minutes, and an additional catalyst mixed solution comprising 10 parts of 1-methoxy-2-propanol and 0.2 parts of azobisisobutyronitrile was added thereto dropwise over a period of 1 hour. Subsequently, the resulting product was aged at 100° C. for 1 hour, after which 40 parts of 1-methoxy-2-propanol was added thereto, and the mixture was cooled. Thereby, a solution of an acrylic resin (ic-1) having a nonvolatile matter of 40% was obtained.

Production Examples 16 to 20

Solutions of acrylic resins (ic-2) to (ic-6) were obtained in the same manner as described in Production Example 15, except that the amounts of the monomers used in Production Example 15 were changed as shown in Table 2. Table 2 shows the nonvolatile matter contents, weight average molecular weights, etc., of the obtained solutions of acrylic resins (ic-1) to (ic-6).

TABLE 2

|  |  | Production Example | | | | | |
|---|---|---|---|---|---|---|---|
|  |  | 15 | 16 | 17 | 18 | 19 | 20 |
| Name of Acrylic Resin | | ic-1 | ic-2 | ic-3 | ic-4 | ic-5 | ic-6 |
| Composition of Monomer, etc. | Methyl methacrylate | 36 | 45 | 51 | 50 | 31 | 40 |
| | Isobornyl acrylate | 30 | 30 | 30 | 30 | 30 | 30 |
| | n-Butyl methacrylate | 10 | 10 | 10 | 20 | 10 | 10 |
| | 2-Hydroxyethyl methacrylate | | | | | 20 | 20 |
| | KBM-503 | 15 | 15 | | | | |
| | 2-(2'-Hydroxy-5'-methacryloyloxyethylphenyl)-2h-benzotriazole | 8.0 | | 8.0 | | 8.0 | |
| | 4-Methacryloyloxy-2,2,6,6-tetramethylpiperidine | 1.0 | | 1.0 | | 1.0 | |
| | Azobisisobutyronitrile (Amount of Initial Dropwise Addition) | 2.0 | 1.7 | 1.5 | 1.0 | 2.0 | 2.0 |
| | Azobisisobutyronitrile (Amount of Additional Dropwise Addition) | 0.2 | 0.2 | 0.2 | 0.2 | 0.2 | 0.2 |
| Nonvolatile Matter (%) | | 40 | 40 | 40 | 40 | 40 | 40 |
| Weight Average MolecularWeight | | 21000 | 25000 | 30000 | 35000 | 20000 | 22000 |

Preparation of Active Energy Ray-Curable Undercoating Composition (Ia)

Preparation Example a1

50 parts of CN9001 (trade name, produced by Sartomer Company, Inc., urethane acrylate), 50 parts of Ebecryl 1290k (trade name, produced by Daicel Cytec Company, Ltd., urethane acrylate), 1.5 parts of Irgacure 184 (trade name, produced by BASF-A.G., 1-hydroxy-cyclohexyl-phenyl-ketone), 1.5 parts of Irgacure 819 (trade name, produced by BASF-A.G., 2,4,6-trimethylbenzoyldiphenylphosphine oxide), 7 parts of RUVA93 (trade name, produced by Otsuka Chemical Co., Ltd., UV absorber), 1 part of Tinuvin123 (trade name, produced by BASF-A.G., light stabilizer), and 0.05 parts of BYK-315 (trade name, produced by BYK-Chemie) as a surface control agent were mixed. Then, 1-methoxy-2-propanol was added thereto to adjust the nonvolatile matter, thereby obtaining an active energy ray-curable undercoating composition (Ia-1) having a nonvolatile matter of 30%.

Preparation Examples a2 to a13

Active energy ray-curable undercoating compositions (Ia-2) to (Ia-13) were obtained in the same manner as described in Preparation Example a1, except that the type and amount of each component used in Preparation Example a1 were changed as shown in Table 3.

In Table 3, the amounts of the components are shown as the amount of the nonvolatile matter. The (Note 3) to (Note 6) in the table refer to the following.

(Note 3) UN952: trade name, produced by Negami Chemical Industrial Co., Ltd., polyfunctional urethane acrylate
(Note 4) Aronix M 315: trade name, produced by Toagosei Co., Ltd., a mixture of bis(2-acryloyloxyethyl)hydroxyethyl isocyanurate, and tris(2-acryloyloxyethyl)isocyanurate
(Note 5) TINUVIN 928: trade name, produced by BASF-A.G, a UV absorber
(Note 6) ADK STAB LA82: trade name, produced by Adeka Corporation, a light stabilizer

TABLE 3

|  |  | Preparation Example | | | | | | | | | | | | |
|---|---|---|---|---|---|---|---|---|---|---|---|---|---|
|  |  | a1 | a2 | a3 | a4 | a5 | a6 | a7 | a8 | a9 | a10 | a11 | a12 | a13 |
| Active Energy Ray-curable Undercoating Composition No. | | Ia-1 | Ia-2 | Ia-3 | Ia-4 | Ia-5 | Ia-6 | Ia-7 | Ia-8 | Ia-9 | Ia-10 | Ia-11 | Ia-12 | Ia-13 |
| CN9001 | | 50.0 | 50.0 | 40.0 | 50.0 | 50.0 | | | | | | | | |
| Ebecryl 1290k | | 50.0 | 50.0 | 50.0 | 50.0 | 50.0 | 70.0 | 70.0 | 70.0 | 70.0 | | | | |
| UN952 | (Note 3) | | | | | | | | | | 70.0 | 70.0 | 70.0 | 70.0 |
| Aronix M 315 | (Note 4) | | | 10.0 | | | | | | | | | | |
| Unsaturated Acrylic Resin A produced in Production Example 5 | | | | | | | 30.0 | 30.0 | | | 30.0 | 30.0 | | |
| Unsaturated Acrylic Resin B produced in Production Example 6 | | | | | | | | | 30.0 | | | | 30.0 | |
| Unsaturated Acrylic Resin C produced in Production Example 7 | | | | | | | | | | 30.0 | | | | 30.0 |
| Irgacure 184 | | 1.5 | 1.5 | 1.5 | 1.5 | 1.5 | 1.5 | 1.5 | 1.5 | 1.5 | 1.5 | 1.5 | 1.5 | 1.5 |
| Irgacure 819 | | 1.5 | 1.5 | 1.5 | 1.5 | 1.5 | 1.5 | 1.5 | 1.5 | 1.5 | 1.5 | 1.5 | 1.5 | 1.5 |
| RUVA93 | | 7.0 | 10.0 | 7.0 | | 7.0 | 7.0 | | | | 7.0 | | | |
| TINUVIN 928 | (Note 5) | | | | 7.0 | | | 7.0 | | | | 7.0 | | |
| ADK STAB LA82 | (Note 6) | | | | | 1.0 | | | | | | | | |
| TINUVIN 123 | | 1.0 | 1.5 | 1.0 | 1.0 | | 1.0 | 1.0 | 1.0 | 1.0 | 1.0 | 1.0 | 1.0 | 1.0 |
| BYK-315 | | 0.05 | 0.05 | 0.05 | 0.05 | 0.05 | 0.05 | 0.05 | 0.05 | 0.05 | 0.05 | 0.05 | 0.05 | 0.05 |

Preparation of Photo- and Heat-Curable Undercoating Composition (Ib)

Preparation Example b1

65.5 parts of the 80% solution of the product (ib-1) obtained in Production Example 8 (nonvolatile matter: 52.4 parts), 86.6 parts of the 55% solution of the hydroxy-containing acrylic resin obtained in Production Example 14 (nonvolatile matter: 47.6 parts), 3.0 parts of Darocur 1173 (trade name, produced by Merck Japan Ltd., a photoinitiator), 6.0 parts of TINUVIN 384 (trade name, produced by Ciba Specialty Chemicals, an UV absorber), 1 part of TINUVIN 123 (trade name, produced by BASF-A.G., a light stabilizer), and 0.05 parts of BYK-315 (trade name, produced by BYK-Chemie) as a surface control agent were mixed. Then, 1-methoxy-2-propanol was added thereto to adjust the nonvolatile matter, thereby obtaining a photo- and heat-curable undercoating composition (Ib-1) having a nonvolatile matter of 30%.

Preparation Example b2 to b14

Photo- and heat-curable undercoating compositions (Ib-2) to (Ib-14) were obtained in the same manner as in Preparation Example b1, except that the type and amount of each component used in Preparation Example b1 were changed as shown in Table 4. In Table 4, the amounts of the components are shown as the amount of the nonvolatile matter.

TABLE 4

| | | Preparation Example | | | | | | | | | | | | | |
|---|---|---|---|---|---|---|---|---|---|---|---|---|---|---|---|
| | | b1 | b2 | b3 | b4 | b5 | b6 | b7 | b8 | b9 | b10 | b11 | b12 | b13 | b14 |
| Photo- and Heat-curable Undercoating Composition No. | | Ib-1 | Ib-2 | Ib-3 | Ib-4 | Ib-5 | Ib-6 | Ib-7 | Ib-8 | Ib-9 | Ib-10 | Ib-11 | Ib-12 | Ib-13 | Ib-14 |
| CN9001 | | | | | | | | 15.8 | 15.8 | 15.8 | 15.8 | | | 15.8 | |
| Aronix M-315 | (Note 4) | | | | | | | | | | | 15.8 | 15.8 | | 15.8 |
| Product | ib-1 | 52.4 | | | | | | 21.1 | | | | | | | |
| | ib-2 | | 52.4 | | | 25.0 | 45.5 | | 21.1 | | | | 21.1 | | |
| | ib-3 | | | 52.4 | | | | | | 21.1 | | | | | |
| | ib-4 | | | | 52.4 | | | | | | 21.1 | 21.1 | | | |
| | ib-5 | | | | | | | | | | | | | 21.1 | |
| | ib-6 | | | | | | | | | | | | | | 21.1 |
| Hydroxy-containing acrylic resin | | 47.6 | 47.6 | 47.6 | 47.6 | 62.5 | 45.5 | 52.6 | 52.6 | 52.6 | 52.6 | 52.6 | 52.6 | 52.6 | 52.6 |
| Isocyanurate ring adduct of hexamethylene diisocyanate (NCO Content: 21%) | | | | | | 12.5 | 12.5 | 10.5 | 10.5 | 10.5 | 10.5 | 10.5 | 10.5 | 10.5 | 10.5 |
| Darocur 1173 | | 3.0 | 3.0 | 3.0 | 3.0 | 3.0 | 3.0 | 3.0 | 3.0 | 3.0 | 3.0 | 3.0 | 3.0 | 3.0 | 3.0 |
| TINUVIN 384 | | 6.0 | 6.0 | 6.0 | 6.0 | 2.0 | 2.0 | 6.0 | 6.0 | 6.0 | 6.0 | 6.0 | 6.0 | 2.0 | 6.0 |
| TINUVIN 123 | | 1.0 | 1.0 | 1.0 | 1.0 | 1.0 | 1.0 | 1.0 | 1.0 | 1.0 | 1.0 | 1.0 | 1.0 | 1.0 | 1.0 |
| BYK-315 | | 0.05 | 0.05 | 0.05 | 0.05 | 0.05 | 0.05 | 0.05 | 0.05 | 0.05 | 0.05 | 0.05 | 0.05 | 0.05 | 0.05 |

Preparation of Room Temperature- or Heat-Curable Undercoating Composition (Ic)

Preparation Example c1

250 parts of the 40% solution of the acrylic resin obtained in Production Example c1 (nonvolatile matter: 100 parts) and 0.05 parts of BYK-315 (trade name, produced by BYK-Chemie) as a surface control agent were uniformly mixed. Then, 1-methoxy-2-propanol was added thereto to adjust the nonvolatile matter content, thereby obtaining a room temperature- or heat-curable undercoating composition (Ic-1) having a nonvolatile matter of 30%.

Preparation Examples c2 to c10

Room temperature- or heat-curable undercoating compositions (Ic-2) to (Ic-10) were obtained in the same manner as described in Preparation Example 1, except that the type and amount of each component used in Preparation Example 1 were changed as shown in Table 5. In Table 5, the amounts of the components are shown as the amount of the nonvolatile matter. The (Note 7) to (Note 9) refer to the following.
(Note 7) Sumidur N3300: trade name; produced by Sumika Bayer Urethane Co., Ltd.; isocyanurate-modified hexamethylene diisocyanate; nonvolatile matter: 100%
(Note 8) Cymel 235: trade name, produced by Mitsui Cytec, Ltd., methylated/butylated melamine resin
(Note 9) TINUVIN 479: trade name, produced by BASF-A.G., a UV absorber

TABLE 5

|  |  | Preparation Example | | | | | | | | | |
|---|---|---|---|---|---|---|---|---|---|---|---|
|  |  | c1 | c2 | c3 | c4 | c5 | c6 | c7 | c8 | c9 | c10 |
| Room Temperature- or Heat-Curable Undercoating Composition No. | | Ic-1 | Ic-2 | Ic-3 | Ic-4 | Ic-5 | Ic-6 | Ic-7 | Ic-8 | Ic-9 | Ic-10 |
| Acrylic Resin | ic-1 | 100.0 | | | | | 50 | | | | |
|  | ic-2 | | 100.0 | | | 50.0 | | | | | |
|  | ic-3 | | | 100.0 | | 50.0 | | | | | |
|  | ic-4 | | | | 100.0 | | 50 | | | | |
|  | ic-5 | | | | | | | 90.0 | | 80.0 | |
|  | ic-6 | | | | | | | | 90.0 | | 80.0 |
| Sumidur N3300 | (Note 7) | | | | | | | 10.0 | 10.0 | | |
| Cymel 235 | (Note 8) | | | | | | | | | 20.0 | 20.0 |
| Dibutyltin Dilaurate | | | | | | | | 0.03 | 0.03 | | |
| p-Toluenesulfonic acid diisopropanol amine salt | | | | | | | | | | 0.5 | 0.5 |
| TINUVIN 928 | (Note 5) | | 4.0 | | 4.0 | 2.0 | 2.0 | 4.0 | 4.0 | 4.0 | 4.0 |
| TINUVIN 479 | (Note 9) | | 4.0 | | 4.0 | 2.0 | 2.0 | 4.0 | 4.0 | 4.0 | 4.0 |
| TINUVIN 123 | | | 1.0 | | 1.0 | 0.5 | 0.5 | 1.0 | 1.0 | 1.0 | 1.0 |
| BYK-315 | | 0.05 | 0.05 | 0.05 | 0.05 | 0.05 | 0.05 | 0.05 | 0.05 | 0.05 | 0.05 |

Preparation of Active Energy Ray-Curable Top Coating Composition (Ii)

Preparation Example 1

200 parts of the solution of the product (P2) obtained in Production Example 1 (nonvolatile matter: 100 parts), 3 parts of Irgacure 184, 1 part of Irgacure 819 (trade name, produced by BASF-A.G., 2,4,6-trimethylbenzoyldiphenylphosphine oxide), 2 parts of RUVA-93 (trade name, produced by Otsuka Chemical Co., Ltd., UV absorber), 1 part of TINUVIN 123 (trade name, produced by BASF-A.G, a light stabilizer), and 0.5 parts of BYK-3500 (trade name, produced by BYK-Chemie) as a surface control agent were mixed. Then, 1-methoxy-2-propanol was added thereto to adjust the nonvolatile matter content, thereby obtaining an active energy ray-curable top coating composition (II-1) having a nonvolatile matter of 30%.

Preparation Example 2 to 16

Active energy ray-curable top coating compositions (II-2) to (II-16) were obtained in the same manner as described in Preparation Example 1, except that the type and amount of each component used in Preparation Example 1 were changed as shown in Table 6.

TABLE 6

|  |  | Preparation Example | | | | | | | | | | | | | | | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| Active Energy Ray-curable Top Coating Composition No. | | II-1 | II-2 | II-3 | II-4 | II-5 | II-6 | II-7 | II-8 | II-9 | II-10 | II-11 | II-12 | II-13 | II-14 | II-15 | II-16 |
| Product (P2) obtained in Production Example 1 | | 100.0 | | 50.0 | 50.0 | 85.0 | 85.0 | | | | 85.0 | 95.0 | 95.0 | | | | |
| Product (P4) obtained in Production Example 2 | | | 100.0 | | | | | 85.0 | | | | | | | | | |
| Product (P5) obtained in Production Example 3 | | | | | | | | | 85.0 | | | | | | | | |
| Product (P6) obtained in Production Example 4 | | | | | | | | | | 85.0 | | | | | | | |
| Ebecryl 1290k | | | | | 30.0 | | | | | | | | | 100.0 | | 100.0 | 100.0 |
| Aronix M 408 | (Note 11) | | 30.0 | | | 10.0 | 10.0 | 10.0 | 10.0 | 10.0 | 10.0 | 5.0 | 5.0 | | 100.0 | | |
| Aronix M 315 | | | | 10.0 | 10.0 | | | | | | | | | | | | |
| IRR214K | (Note 12) | | | 10.0 | 10.0 | 5.0 | 5.0 | 5.0 | 5.0 | 5.0 | 5.0 | | | | | | |
| MEK-ST | (Note 13) | | | | | | | | | | | 10.0 | | | | 15.0 | |
| Polymerizable silane-modified colloidal silica | (Note 14) | | | | | | | | | | | | 10.0 | | | | 15.0 |
| Irgacure 184 | | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Irgacure 819 | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| RUVA93 | | 2.0 | 2.0 | 2.0 | 2.0 | 2.0 | | | | | | 2.0 | 2.0 | 2.0 | 2.0 | 2.0 | 2.0 |
| TINUVIN 928 | (Note 5) | | | | | | 2.0 | 2.0 | 2.0 | 2.0 | | | | | | | |
| TINUVIN 479 | (Note 9) | | | | | | | | | | 2.0 | | | | | | |
| ADK STAB LA82 | (Note 6) | | | | | 1.0 | | | | | | | | | | | |
| TINUVIN 123 | | 1.0 | 1.0 | 1.0 | 1.0 | | 1.0 | 1.0 | 1.0 | 1.0 | 1.0 | 1.0 | 1.0 | 1.0 | 1.0 | 1.0 | 1.0 |
| BYK-3500 | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

In Table 6 above, the amounts of the components are shown as the amount of the nonvolatile matter. The (Note 11) to (Note 14) in the table refer to the following.
(Note 11) Aronix M 408: trade name, produced by Toagosei Co., Ltd., ditrimethylolpropanetetraacrylate
(Note 12) IRR214K: trade name, produced by Daicel Cytec Company, Ltd., tricyclodecanedimethanol dimethacrylate
(Note 13) MEK-ST: trade name, produced by Nissan Chemical Industries, Ltd., colloidal silica
(Note 14) Polymerizable silane-modified colloidal silica: produced in the following manner:
333 parts (100 parts of silica particles) of colloidal silica particles (dispersion medium; isopropanol; silica concentration: 30 mass; average primary particle diameter: 12 nm; trade name: IPA-ST; produced by Nissan Chemical Industries, Ltd.), 10 parts of 3-methacryloyloxypropyltrimethoxysilane, 0.2 parts of p-methoxyphenol, and 233 parts of isopropanol were placed in a separable flask equipped with a reflux condenser, a thermometer, an air inlet tube, and a stirrer, and the mixture was stirred and heated while blowing dry air thereinto. When the volatile matter started to reflux, propylene glycol monomethyl ether was added thereto to perform azeotropic distillation, thereby substituting the solvent in the reaction system. Subsequently, a dehydration condensation reaction was performed with stirring at 95° C. for 2 hours, after which the temperature was lowered to 60° C., 0.03 parts of tetrabutylammonium fluoride was added thereto, and a reaction was carried out for another 1 hour with stirring. After completion of the reaction, the volatile matter was distilled off under reduced conditions, and propylene glycol monomethyl ether was further added to perform azeotropic distillation. An azeotropic distillation with the addition of propylene glycol monomethyl ether was performed several times so as to substitute the solvent, thereby obtaining a polymerizable silane modified-colloidal silica particle dispersion having a nonvolatile matter of 40%.

Examples a1 to a36 and Comparative Examples a1 to a18

Each of the active energy ray-curable undercoating compositions shown in Table 7 was applied by air spray coating to a polycarbonate resin plate to a film thickness of 8 μm when dried. Subsequently, the coated plate was preheated at 80° C. for 10 minutes and then irradiated with an active energy ray at a dose of 2,000 mJ/cm² using a metal halide lamp to cure the coating film. Thereafter, when the temperature of the coated plate reached 50° C. or lower, each active energy ray-curable top coating composition shown in Table 7 was applied thereto by air spray coating to a film thickness of 5 μm when dried. Subsequently, the resulting coated plate was preheated at 60° C. for 5 minutes and then irradiated with an active energy ray at a dose of 4,000 mJ/cm² using an ultra-high-pressure mercury lamp to cure the coating film, thereby obtaining each coated test plate. The obtained coated test plates were subjected to the following evaluation. Table 7 also shows the evaluation results.

TABLE 7

| | Example | | | | | | | | | | | | | | | | | |
|---|---|---|---|---|---|---|---|---|---|---|---|---|---|---|---|---|---|---|
| | a1 | a2 | a3 | a4 | a5 | a6 | a7 | a8 | a9 | a10 | a11 | a12 | a13 | a14 | a15 | a16 | a17 | a18 |
| Active Energy Ray-curable Undercoating Composition No. | Ia-1 | Ia-1 | Ia-1 | Ia-1 | Ia-1 | Ia-1 | Ia-1 | Ia-1 | Ia-1 | Ia-1 | Ia-1 | Ia-1 | Ia-2 | Ia-3 | Ia-4 | Ia-5 | Ia-6 | Ia-7 |
| Active Energy Ray-curable Top Coating Composition No. | II-1 | II-2 | II-3 | II-4 | II-5 | II-6 | II-7 | II-8 | II-9 | II-10 | II-11 | II-12 | II-1 | II-1 | II-1 | II-1 | II-1 | II-1 |
| Scratch Resistance | S | S | A | A | S | S | S | S | S | S | S | S | S | S | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | A | A | S | S | S | S | S | S | S | S | S | S | S | S | S | S |

| | Example | | | | | | | | | | | | | | | | | |
|---|---|---|---|---|---|---|---|---|---|---|---|---|---|---|---|---|---|---|
| | a19 | a20 | a21 | a22 | a23 | a24 | a25 | a26 | a27 | a28 | a29 | a30 | a31 | a32 | a33 | a34 | a35 | a36 |
| Active Energy Ray-curable Undercoating Composition No. | Ia-8 | Ia-9 | Ia-2 | Ia-3 | Ia-4 | Ia-5 | Ia-6 | Ia-7 | Ia-8 | Ia-9 | Ia-2 | Ia-3 | Ia-4 | Ia-5 | Ia-6 | Ia-7 | Ia-8 | Ia-9 |
| Active Energy Ray-curable Top Coating Composition No. | II-1 | II-1 | II-4 | II-4 | II-4 | II-4 | II-4 | II-4 | II-4 | II-4 | II-12 | II-12 | II-12 | II-12 | II-12 | II-12 | II-12 | II-12 |
| Scratch Resistance | S | S | A | A | A | A | A | A | A | A | S | S | S | S | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | A | A | A | A | A | A | A | A | S | S | S | S | S | S | S | S |

TABLE 7-continued

| | Comparative Example | | | | | | | | | | | | | | | | | |
|---|---|---|---|---|---|---|---|---|---|---|---|---|---|---|---|---|---|---|
| | a1 | a2 | a3 | a4 | a5 | a6 | a7 | a8 | a9 | a10 | a11 | a12 | a13 | a14 | a15 | a16 | a17 | a18 |
| Active Energy Ray-curable Undercoating Composition No. | Ia-1 | Ia-1 | Ia-1 | Ia-1 | Ia-2 | Ia-3 | Ia-6 | Ia-7 | Ia-8 | Ia-9 | Ia-2 | Ia-3 | Ia-4 | Ia-5 | Ia-6 | Ia-7 | Ia-8 | Ia-9 |
| Active Energy Ray-curable Top Coating Composition No. | II-13 | II-14 | II-15 | II-16 | II-13 | II-13 | II-13 | II-13 | II-13 | II-13 | II-16 | II-16 | II-16 | II-16 | II-16 | II-16 | II-16 | II-16 |
| Scratch Resistance | A | B | S | S | A | A | A | A | A | A | S | S | S | S | S | S | S | S |
| Initial Adhesion | A | A | A | A | A | A | A | A | A | A | A | A | A | A | A | A | A | A |
| Weather Resistance | C | C | B | B | C | C | C | C | C | C | B | B | B | B | B | B | B | B |
| Comprehensive Evaluation | C | C | B | B | C | C | C | C | C | C | B | B | B | B | B | B | B | B |

Examples a37 to a58 and Comparative Examples a19 to a28

Each of the active energy ray-curable undercoating compositions shown in Table 8 was applied by air spray coating to a polycarbonate resin plate to a film thickness of 8 μm when dried. Subsequently, the coated plate was preheated at 80° C. for 10 minutes. Thereafter, when the temperature of the coated plate reached 50° C. or lower, each of the active energy ray-curable top coating compositions shown in Table 8 was applied thereto by air spray coating to a film thickness of 5 μm when dried. Subsequently, the coated plate was preheated at 60° C. for 5 minutes and then irradiated with an active energy ray at a dose of 4,000 mJ/cm$^2$ using an ultra-high-pressure mercury lamp to cure the coating film, thereby obtaining each coated test plate. The obtained coated test plates were subjected to the following evaluation. Table 8 also shows the evaluation results.

TABLE 8

| | Example | | | | | | | | | | | | | | | |
|---|---|---|---|---|---|---|---|---|---|---|---|---|---|---|---|---|
| | a37 | a38 | a39 | a40 | a41 | a42 | a43 | a44 | a45 | a46 | a47 | a48 | a49 | a50 | a51 | a52 |
| Active Energy Ray-curable Undercoating Composition No. | Ia-10 | Ia-10 | Ia-10 | Ia-10 | Ia-10 | Ia-10 | Ia-10 | Ia-10 | Ia-10 | Ia-10 | Ia-10 | Ia-10 | Ia-11 | Ia-12 | Ia-13 | Ia-14 |
| Active Energy Ray-curable Top Coating Composition No. | II-1 | II-2 | II-3 | II-4 | II-5 | II-6 | II-7 | II-8 | II-9 | II-10 | II-11 | II-12 | II-1 | II-1 | II-1 | II-1 |
| Scratch Resistance | S | S | A | A | S | S | S | S | S | S | S | S | S | S | S | S |
| Initial Adhesion | A | A | A | A | A | A | A | A | A | A | A | A | A | A | A | A |
| Weather Resistance | A | A | A | A | A | A | A | A | A | A | A | A | A | A | A | A |
| Comprehensive Evaluation | S | S | A | A | S | S | S | S | S | S | S | S | S | S | S | S |

| | Example | | | | | | Comparative Example | | | | | | | | | |
|---|---|---|---|---|---|---|---|---|---|---|---|---|---|---|---|---|
| | a53 | a54 | a55 | a56 | a57 | a58 | a19 | a20 | a21 | a22 | a23 | a24 | a25 | a26 | a27 | a28 |
| Active Energy Ray-curable Undercoating Composition No. | Ia-11 | Ia-12 | Ia-13 | Ia-11 | Ia-12 | Ia-13 | Ia-10 | Ia-10 | Ia-10 | Ia-10 | Ia-11 | Ia-12 | Ia-13 | Ia-11 | Ia-12 | Ia-13 |
| Active Energy Ray-curable Top Coating Composition No. | II-4 | II-4 | II-4 | II-12 | II-12 | II-12 | II-13 | II-14 | II-15 | II-16 | II-13 | II-13 | II-13 | II-16 | II-16 | II-16 |
| Scratch Resistance | A | A | A | S | S | S | A | B | S | S | A | A | A | S | S | S |
| Initial Adhesion | A | A | A | A | A | A | A | A | A | A | A | A | A | A | A | A |
| Weather Resistance | A | A | A | A | A | A | C | C | B | B | C | C | C | B | B | B |
| Comprehensive Evaluation | A | A | A | S | S | S | C | C | B | B | C | C | C | B | B | B |

Examples b1 to b39 and Comparative Examples b1 to b14

Each of the photo- and heat-curable undercoating compositions shown in Table 9 was applied by air spray coating to a polycarbonate resin plate to a film thickness of 8 μm when dried. Subsequently, the coated plate was preheated at 60° C. for 5 minutes, and then irradiated with an active energy ray at a radiation dose of 1,500 mJ/cm² using a metal halide lamp, followed by drying at 90° C. for 10 minutes. Thereafter, when the temperature of the coated plate reached 50° C. or lower, each of the active energy ray-curable top coating compositions shown in Table 9 was applied thereto by air spray coating to a film thickness of 5 μm when dried. Subsequently, the resulting coated plate was preheated at 60° C. for 5 minutes and then irradiated with an active energy ray at a dose of 4,000 mJ/cm² using an ultra-high-pressure mercury lamp to cure the coating film, thereby obtaining each coated test plate. The obtained coated test plates were subjected to the following evaluation.

Table 9 also shows the evaluation results.

TABLE 9

| | Example | | | | | | | | | | | | | | | | | |
|---|---|---|---|---|---|---|---|---|---|---|---|---|---|---|---|---|---|---|
| | b1 | b2 | b3 | b4 | b5 | b6 | b7 | b8 | b9 | b10 | b11 | b12 | b13 | b14 | b15 | b16 | b17 | b18 |
| Photo- and Heat-curable Undercoating Composition No. | Ib-2 | Ib-2 | Ib-2 | Ib-2 | Ib-2 | Ib-2 | Ib-2 | Ib-2 | Ib-2 | Ib-2 | Ib-2 | Ib-2 | Ib-1 | Ib-3 | Ib-4 | Ib-7 | Ib-8 | Ib-9 |
| Active Energy Ray-curable Top Coating Composition No. | II-1 | II-2 | II-3 | II-4 | II-5 | II-6 | II-7 | II-8 | II-9 | II-10 | II-11 | II-12 | II-1 | II-1 | II-1 | II-1 | II-1 | II-1 |
| Scratch Resistance | S | S | A | A | S | S | S | S | S | S | S | S | S | S | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | A | A | S | S | S | S | S | S | S | S | S | S | S | S | S | S |

| | Example | | | | | | | | | | | | | | | | | |
|---|---|---|---|---|---|---|---|---|---|---|---|---|---|---|---|---|---|---|
| | b19 | b20 | b21 | b22 | b23 | b24 | b25 | b26 | b27 | b28 | b29 | b30 | b31 | b32 | b33 | b34 | b35 | b36 |
| Photo- and Heat-curable Undercoating Composition No. | Ib-10 | Ib-11 | Ib-12 | Ib-14 | Ib-1 | Ib-3 | Ib-4 | Ib-7 | Ib-8 | Ib-9 | Ib-10 | Ib-11 | Ib-12 | Ib-14 | Ib-7 | Ib-8 | Ib-9 | Ib-10 |
| Active Energy Ray-curable Top Coating Composition No. | II-1 | II-1 | II-1 | II-1 | II-4 | II-4 | II-4 | II-4 | II-4 | II-4 | II-4 | II-4 | II-4 | II-4 | II-12 | II-12 | II-12 | II-12 |
| Scratch Resistance | S | S | S | S | A | A | A | A | A | A | A | A | A | A | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | S | S | A | A | A | A | A | A | A | A | A | A | S | S | S | S |

| | Example | | | Comparative Example | | | | | | | | | | | | | |
|---|---|---|---|---|---|---|---|---|---|---|---|---|---|---|---|---|---|
| | b37 | b38 | b39 | b1 | b2 | b3 | b4 | b5 | b6 | b7 | b8 | b9 | b10 | b11 | b12 | b13 | b14 |
| Photo- and Heat-curable Undercoating Composition No. | Ib-11 | Ib-12 | Ib-14 | Ib-2 | Ib-2 | Ib-2 | Ib-1 | Ib-3 | Ib-4 | Ib-7 | Ib-8 | Ib-9 | Ib-10 | Ib-11 | Ib-12 | Ib-14 |
| Active Energy Ray-curable Top Coating Composition No. | II-12 | II-12 | II-12 | II-13 | II-14 | II-15 | II-16 | II-13 | II-13 | II-13 | II-13 | II-13 | II-13 | II-13 | II-13 | II-13 | II-13 |
| Scratch Resistance | S | S | S | A | B | S | S | A | A | A | A | A | A | A | A | A | A |
| Initial Adhesion | A | A | A | A | A | A | A | A | A | A | A | A | A | A | A | A | A |
| Weather Resistance | A | A | A | C | C | B | B | C | C | C | C | C | C | C | C | C | C |
| Comprehensive Evaluation | S | S | S | C | C | B | B | C | C | C | C | C | C | C | C | C | C |

Examples b40 to b78 and Comparative Examples b15 to b28

Each of the photo- and heat-curable undercoating compositions shown in Table 10 was applied by air spray coating to a polycarbonate resin plate to a film thickness of 8 μm when dried, and heated at 90° C. for 10 minutes. Thereafter, when the temperature of the coated plate reached 50° C. or lower, each of the active energy ray-curable top coating compositions shown in Table 10 was applied thereto by air spray coating to a film thickness of 5 μm when dried. Subsequently, the resulting coated plate was preheated at 60° C. for 5 minutes and then irradiated with an active energy ray at a dose of 4,000 mJ/cm$^2$ using an ultra-high-pressure mercury lamp to cure the coating film, thereby obtaining each coated test plate. The obtained coated test plates were subjected to the following evaluation. Table 10 also shows the evaluation results.

TABLE 10

| | Example | | | | | | | | | | | | | | | | | |
|---|---|---|---|---|---|---|---|---|---|---|---|---|---|---|---|---|---|---|
| | b40 | b41 | b42 | b43 | b44 | b45 | b46 | b47 | b48 | b49 | b50 | b51 | b52 | b53 | b54 | b55 | b56 | b57 |
| Photo- and Heat-curable Undercoating Composition No. | Ib-2 | Ib-2 | Ib-2 | Ib-2 | Ib-2 | Ib-2 | Ib-2 | Ib-2 | Ib-2 | Ib-2 | Ib-2 | Ib-2 | Ib-1 | Ib-3 | Ib-4 | Ib-7 | Ib-8 | Ib-9 |
| Active Energy Ray-curable Top Coating Composition No. | II-1 | II-2 | II-3 | II-4 | II-5 | II-6 | II-7 | II-8 | II-9 | II-10 | II-11 | II-12 | II-1 | II-1 | II-1 | II-1 | II-1 | II-1 |
| Scratch Resistance | S | S | A | A | S | S | S | S | S | S | S | S | S | S | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | A | A | S | S | S | S | S | S | S | S | S | S | S | S | S | S |

| | Example | | | | | | | | | | | | | | | | | |
|---|---|---|---|---|---|---|---|---|---|---|---|---|---|---|---|---|---|---|
| | b58 | b59 | b60 | b61 | b62 | b63 | b64 | b65 | b66 | b67 | b68 | b69 | b70 | b71 | b72 | b73 | b74 | b75 |
| Photo- and Heat-curable Undercoating Composition No. | Ib-10 | Ib-11 | Ib-12 | Ib-14 | Ib-1 | Ib-3 | Ib-4 | Ib-7 | Ib-8 | Ib-9 | Ib-10 | Ib-11 | Ib-12 | Ib-14 | Ib-7 | Ib-8 | Ib-9 | Ib-10 |
| Active Energy Ray-curable Top Coating Composition No. | II-1 | II-1 | II-1 | II-1 | II-4 | II-4 | II-4 | II-4 | II-4 | II-4 | II-4 | II-4 | II-4 | II-4 | II-12 | II-12 | II-12 | II-12 |
| Scratch Resistance | S | S | S | S | A | A | A | A | A | A | A | A | A | A | S | S | S | S |
| Initial Adhesion | A | A | A | A | A | A | A | A | A | A | A | A | A | A | A | A | A | A |
| Weather Resistance | A | A | A | A | A | A | A | A | A | A | A | A | A | A | A | A | A | A |
| Comprehensive Evaluation | S | S | S | S | A | A | A | A | A | A | A | A | A | A | S | S | S | S |

| | Example | | | Comparative Example | | | | | | | | | | | | | |
|---|---|---|---|---|---|---|---|---|---|---|---|---|---|---|---|---|---|
| | b76 | b77 | b78 | b15 | b16 | b17 | b18 | b19 | b20 | b21 | b22 | b23 | b24 | b25 | b26 | b27 | b28 |
| Photo- and Heat-curable Undercoating Composition No. | Ib-11 | Ib-12 | Ib-14 | Ib-2 | Ib-2 | Ib-2 | Ib-2 | Ib-1 | Ib-3 | Ib-4 | Ib-7 | Ib-8 | Ib-9 | Ib-10 | Ib-11 | Ib-12 | Ib-14 |
| Active Energy Ray-curable Top Coating Composition No. | II-12 | II-12 | II-12 | II-13 | II-14 | II-15 | II-16 | II-13 | II-13 | II-13 | II-13 | II-13 | II-13 | II-13 | II-13 | II-13 | II-13 |
| Scratch Resistance | S | S | S | A | B | S | S | A | A | A | A | A | A | A | A | A | A |
| Initial Adhesion | A | A | A | A | A | A | A | A | A | A | A | A | A | A | A | A | A |
| Weather Resistance | A | A | A | C | C | B | B | C | C | C | C | C | C | C | C | C | C |
| Comprehensive Evaluation | S | S | S | C | C | B | B | C | C | C | C | C | C | C | C | C | C |

Examples b79 to b96 and Comparative Examples b29 to b33

Each of the photo- and heat-curable undercoating compositions shown in Table 11 was applied by air spray coating to a polycarbonate resin plate to a film thickness of 30 μm when dried. Subsequently, the coated plate was preheated at 60° C. for 5 minutes, and then irradiated with an active energy ray at a dose of 1,000 mJ/cm² using a metal halide lamp, followed by drying at 90° C. for 10 minutes. Thereafter, when the temperature of the coated plate reached 50° C. or lower, each of the active energy ray-curable top coating compositions shown in Table 11 was applied thereto by air spray coating to a film thickness of 5 μm when dried. Subsequently, the resulting coated plate was preheated at 60° C. for 5 minutes and then irradiated with an active energy ray at a dose of 4,000 mJ/cm² using an ultra-high-pressure mercury lamp to cure the coating film, thereby obtaining each coated test plate. The obtained coated test plates were subjected to the following evaluation. Table 11 also shows the evaluation results.

TABLE 11

|  | Example |  |  |  |  |  |  |  |  |  |  |  |
|---|---|---|---|---|---|---|---|---|---|---|---|---|
|  | b79 | b80 | b81 | b82 | b83 | b84 | b85 | b86 | b87 | b88 | b89 | b90 |
| Active Energy Ray-curable Undercoating Composition No. | Ib-5 | Ib-5 | Ib-5 | Ib-5 | Ib-5 | Ib-5 | Ib-5 | Ib-5 | Ib-5 | Ib-5 | Ib-5 | Ib-5 |
| Active Energy Ray-curable Top Coating Composition No. | II-1 | II-2 | II-3 | II-4 | II-5 | II-6 | II-7 | II-8 | II-9 | II-10 | II-11 | II-12 |
| Scratch Resistance | S | S | A | A | S | S | S | S | S | S | S | S |
| Initial Adhesion | A | A | A | A | A | A | A | A | A | A | A | A |
| Weather Resistance | A | A | A | A | A | A | A | A | A | A | A | A |
| Comprehensive Evaluation | S | S | A | A | S | S | S | S | S | S | S | S |

|  | Example |  |  |  |  |  | Comparative Example |  |  |  |  |
|---|---|---|---|---|---|---|---|---|---|---|---|
|  | b91 | b92 | b93 | b94 | b95 | b96 | b29 | b30 | b31 | b32 | b33 |
| Active Energy Ray-curable Undercoating Composition No. | Ib-6 | Ib-6 | Ib-6 | Ib-13 | Ib-13 | Ib-13 | Ib-5 | Ib-5 | Ib-5 | Ib-5 | Ib-6 |
| Active Energy Ray-curable Top Coating Composition No. | II-1 | II-4 | II-12 | II-1 | II-4 | II-12 | II-13 | II-14 | II-15 | II-16 | II-13 |
| Scratch Resistance | S | A | S | S | A | S | A | B | S | S | A |
| Initial Adhesion | A | A | A | A | A | A | A | A | A | A | A |
| Weather Resistance | A | A | A | A | A | A | C | C | B | B | C |
| Comprehensive Evaluation | S | A | S | S | A | S | C | C | B | B | C |

Examples b97 to b114 and Comparative Examples b34 to b38

Each of the photo- and heat-curable undercoating compositions shown in Table 12 was applied by air spray coating to a polycarbonate resin plate to a film thickness of 30 μm when dried, and heated at 90° C. for 10 minutes. Thereafter, when the temperature of the coated plate reached 50° C. or lower, each of the active energy ray-curable top coating compositions shown in Table 12 was applied thereto by air spray coating to a film thickness of 5 μm when dried. Subsequently, the resulting coated plate was preheated at 60° C. for 5 minutes and then irradiated with an active energy ray at a dose of 4,000 mJ/cm² using an ultra-high-pressure mercury lamp to cure the coating film, thereby obtaining each coated test plate. The obtained coated test plates were subjected to the following evaluation. Table 12 also shows the evaluation results.

TABLE 12

| | | b97 | b98 | b99 | b100 | b101 | b102 | b103 | b104 | b105 | b106 | b107 | b108 |
|---|---|---|---|---|---|---|---|---|---|---|---|---|---|
| | | Example | | | | | | | | | | | |
| Active Energy Ray-curable Undercoating Composition No. | | Ib-5 | Ib-5 | Ib-5 | Ib-5 | Ib-5 | Ib-5 | Ib-5 | Ib-5 | Ib-5 | Ib-5 | Ib-5 | Ib-5 |
| Active Energy Ray-curable Top Coating Composition No. | | II-1 | II-2 | II-3 | II-4 | II-5 | II-6 | II-7 | II-8 | II-9 | II-10 | II-11 | II-12 |
| Scratch Resistance | | S | S | A | A | S | S | S | S | S | S | S | S |
| Initial Adhesion | | A | A | A | A | A | A | A | A | A | A | A | A |
| Weather Resistance | | A | A | A | A | A | A | A | A | A | A | A | A |
| Comprehensive Evaluation | | S | S | A | A | S | S | S | S | S | S | S | S |

| | | b109 | b110 | b111 | b112 | b113 | b114 | b34 | b35 | b36 | b37 | b38 |
|---|---|---|---|---|---|---|---|---|---|---|---|---|
| | | Example | | | | | | Comparative Example | | | | |
| Active Energy Ray-curable Undercoating Composition No. | | Ib-6 | Ib-6 | Ib-6 | Ib-13 | Ib-13 | Ib-13 | Ib-5 | Ib-5 | Ib-5 | Ib-5 | Ib-6 |
| Active Energy Ray-curable Top Coating Composition No. | | II-1 | II-4 | II-12 | II-1 | II-4 | II-12 | II-13 | II-14 | II-15 | II-16 | II-13 |
| Scratch Resistance | | S | A | S | S | A | S | A | B | S | S | A |
| Initial Adhesion | | A | A | A | A | A | A | A | A | A | A | A |
| Weather Resistance | | A | A | A | A | A | A | C | C | B | B | C |
| Comprehensive Evaluation | | S | A | S | S | A | S | C | C | B | B | C |

Examples c1 to c32 and Comparative Examples c1 to c15

Each of the undercoating compositions shown in Table 13 was applied by air spray coating to a polycarbonate resin plate to a film thickness of 8 μm when dried. Subsequently, setting was performed for 5 minutes, after which heating was performed at 80° C. for 30 minutes. When the temperature of the coated plate reached 50° C. or lower, each of the active energy ray-curable top coating compositions shown in Table 13 was applied thereto by air spray coating to a film thickness of 5 μm when dried. Subsequently, the resulting coated plate was preheated at 60° C. for 5 minutes and then irradiated with an active energy ray at a dose of 4,000 mJ/cm$^2$ using an ultra-high-pressure mercury lamp to cure the coating film, thereby obtaining each coated test plate. The obtained coated test plates were subjected to the following evaluation. Table 13 also shows the evaluation results.

TABLE 13

| | c1 | c2 | c3 | c4 | c5 | c6 | c7 | c8 | c9 | c10 | c11 | c12 | c13 | c14 | c15 | c16 | c17 |
|---|---|---|---|---|---|---|---|---|---|---|---|---|---|---|---|---|---|
| | Example | | | | | | | | | | | | | | | | |
| Undercoating Composition | Ic-1 | Ic-1 | Ic-1 | Ic-1 | Ic-1 | Ic-1 | Ic-1 | Ic-1 | Ic-1 | Ic-1 | Ic-1 | Ic-1 | Ic-2 | Ic-3 | Ic-4 | Ic-5 | Ic-6 |
| Active Energy Ray-curable Top Coating Composition No. | II-1 | II-2 | II-3 | II-4 | II-5 | II-6 | II-7 | II-8 | II-9 | II-10 | II-11 | II-12 | II-1 | II-1 | II-1 | II-1 | II-1 |
| Scratch Resistance | S | S | A | A | S | S | S | S | S | S | S | S | S | S | S | S | S |
| Initial Adhesion | A | A | A | A | A | A | A | A | A | A | A | A | A | A | A | A | A |
| Weather Resistance | A | A | A | A | A | A | A | A | A | A | A | A | A | A | A | A | A |
| Comprehensive Evaluation | S | S | A | A | S | S | S | S | S | S | S | S | S | S | S | S | S |

| | c18 | c19 | c20 | c21 | c22 | c23 | c24 | c25 | c26 | c27 | c28 | c29 | c30 | c31 | c32 |
|---|---|---|---|---|---|---|---|---|---|---|---|---|---|---|---|
| | Example | | | | | | | | | | | | | | |
| Undercoating Composition | Ic-7 | Ic-7 | Ic-7 | Ic-7 | Ic-7 | Ic-7 | Ic-7 | Ic-7 | Ic-7 | Ic-7 | Ic-7 | Ic-7 | Ic-8 | Ic-8 | Ic-8 |
| Active Energy Ray-curable | II-1 | II-2 | II-3 | II-4 | II-5 | II-6 | II-7 | II-8 | II-9 | II-10 | II-11 | II-12 | II-1 | II-12 | II-12 |

TABLE 13-continued

| Top Coating Composition No. | | | | | | | | | | | | | | | |
|---|---|---|---|---|---|---|---|---|---|---|---|---|---|---|---|
| Scratch Resistance | S | S | A | A | S | S | S | S | S | S | S | S | S | S | S |
| Initial Adhesion | A | A | A | A | A | A | A | A | A | A | A | A | A | A | A |
| Weather Resistance | A | A | A | A | A | A | A | A | A | A | A | A | A | A | A |
| Comprehensive Evaluation | S | S | A | A | S | S | S | S | S | S | S | S | S | S | S |

| | Comparative Example | | | | | | | | | | | | | |
|---|---|---|---|---|---|---|---|---|---|---|---|---|---|---|
| | c1 | c2 | c3 | c4 | c5 | c6 | c7 | c8 | c9 | c11 | c12 | c13 | c14 | c15 |
| Undercoating composition | Ic-1 | Ic-1 | Ic-1 | Ic-1 | Ic-2 | Ic-3 | Ic-4 | Ic-5 | Ic-6 | Ic-7 | Ic-7 | Ic-7 | Ic-7 | Ic-8 |
| Active Energy Ray-curable Top Coating Composition No. | II-13 | II-14 | II-15 | II-16 | II-13 | II-13 | II-13 | II-13 | II-13 | II-13 | II-14 | II-15 | II-16 | II-13 |
| Scratch Resistance | A | B | S | S | A | A | A | A | A | A | B | S | S | A |
| Initial Adhesion | A | A | A | A | A | A | A | A | A | A | A | A | A | A |
| Weather Resistance | C | C | B | B | C | C | C | C | C | C | C | B | B | C |
| Comprehensive Evaluation | C | C | B | B | C | C | C | C | C | C | C | B | B | C |

Examples c33 to c38 and Comparative Examples c16 to c17

Each of the undercoating compositions shown in Table 14 was applied by air spray coating to a polycarbonate resin plate to a film thickness of 8 μm when dried. Subsequently, setting was performed for 5 minutes, after which heating was performed at 120° C. for 30 minutes. Thereafter, when the temperature of the coated plate reached 50° C. or lower, each of the active energy ray-curable top coating compositions shown in Table 14 was applied thereto by air spray coating to a film thickness of 5 μm when dried. Subsequently, the resulting coated plate was preheated at 60° C. for 5 minutes and then irradiated with an active energy ray at a dose of 4,000 mJ/cm² using an ultra-high-pressure mercury lamp to cure the coating film, thereby obtaining each coated test plate. The obtained coated test plates were subjected to the following evaluation. Table 14 also shows the evaluation results.

Scratch Resistance

Each test panel was subjected to a Taber abrasion test (abrading wheel CF-10P, a 500 g load, 500 cycles) according to ASTM D1044. The haze values of the coating film before and after the test were measured to calculate the difference (ΔH), and evaluation was carried out according to the following criteria.

S: ΔH being less than 15
A: ΔH being 15 or more and less then 20
B: ΔH being 20 or more and less than 30
C: ΔH being 30 or more Initial Adhesion According to JIS K 5600-5-6 (1990), a grid of 100 squares (2 mm×2 mm) was formed on the coating film so that it reached the substrate, and adhesive tape was applied to the grid portion. After the adhesive tape was abruptly peeled off, the number of grid squares remaining on the surface of the coating film was evaluated.

A: Remaining number/Entire number=100 squares/100 squares
B: Remaining number/Entire number=99 to 90 squares/100 squares
C: Remaining number/Entire number=89 squares or less/100 squares

TABLE 14

| | Example | | | | | | Comparative Example | |
|---|---|---|---|---|---|---|---|---|
| | c33 | c34 | c35 | c36 | c37 | c38 | c16 | c17 |
| Undercoating Composition | Ic-9 | Ic-10 | Ic-9 | Ic-10 | Ic-9 | Ic-10 | Ic-9 | Ic-10 |
| Active Energy Ray-curable Top Coating Composition | II-1 | II-1 | II-5 | II-5 | II-12 | II-12 | II-13 | II-13 |
| Scratch Resistance | S | S | S | S | S | S | A | A |
| Initial Adhesion | A | A | A | A | A | A | A | A |
| Weather Resistance | A | A | A | A | A | A | C | C |
| Comprehensive Evaluation | S | S | S | S | S | S | C | C |

Weather Resistance

With respect to each test plate, 40 cycles were carried out with each cycle being performed under conditions of 24-hour UV irradiation-24-hour water spray, at a black panel temperature of 60° C., using a super UV tester (produced by Dainippon Plastics Co., Ltd.; model: W-13; and an accelerated weathering tester). The appearance and adhesion were evaluated according to the following criteria. The appearance was visually evaluated and the adhesion was evaluated in the same manner as described above in the evaluation of the initial adhesion.

A: No cracks in the coating film, with the adhesion: Remaining number/Entire number=100 squares/100 squares B: No cracks in the coating film, with the adhesion: Remaining number/Entire number=99 squares or less/100 squares C: Cracks are observed Comprehensive Evaluation It is important that a multi-layered coating film is excellent in all of scratch resistance, initial adhesion, and weather resistance. A comprehensive evaluation was thus performed according to the following criteria:

S: The evaluation result of scratch resistance is S, and the evaluation results of initial adhesion and weather resistance are A A: The evaluation result of scratch resistance is A, and the evaluation results of initial adhesion and weather resistance are A B: The evaluation results of scratch resistance, initial adhesion, and weather resistance are all S, A, or B, and at least one result is B C: At least one of the evaluation results of scratch resistance, initial adhesion, and weather resistance is C

The invention claimed is:

1. A method of forming a multi-layered coating film comprising the steps of
   (1) forming an undercoating film using an undercoating composition (I), and
   (2) forming a top coating film on the undercoating film after the formation of the undercoating film, the top coating film being formed using an active energy ray-curable top coating composition (II) comprising a silsesquioxane compound (a) and a photoinitiator (b),
   the silsesquioxane compound (a) comprising one or more organic groups each directly bonded to a silicone atom, and
   at least one of the organic groups having one or more urethane bonds and one (meth)acryloyloxy group.

2. The method according to claim 1, wherein the organic group having one or more urethane bonds and one (meth)acryloyl oxy group in the component (a) is an organic group represented by the following formula (A)

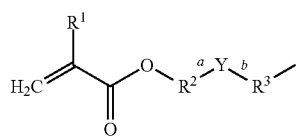

(A)

wherein R$^1$ represents hydrogen or methyl,
R$^2$ represents C$_{1-10}$ divalent hydrocarbon,
R$^3$ represents C$_{1-10}$ divalent hydrocarbon, and
Y represents

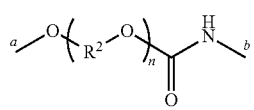

wherein R$^2$ is the same as above, and n represents an integer of 0 to 9,

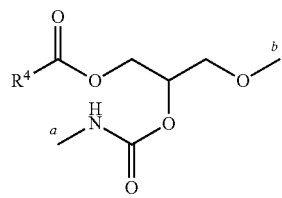

wherein R$^4$ represents substituted or unsubstituted C$_{1-6}$ monovalent hydrocarbon, or

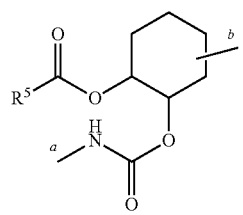

wherein R$^5$ represents substituted or unsubstituted C$_{1-6}$ monovalent hydrocarbon.

3. The method according to claim 1, wherein
the active energy ray-curable top coating composition (II) comprises a photoinitiator (b) in an amount of 1 to 20 parts by mass per 100 parts by mass of nonvolatile matter of a silsesquioxane compound (a).

4. The method according to claim 1, wherein the active energy ray-curable top coating composition (II) further comprises a polymerizable unsaturated compound (c).

5. The method according to claim 4, wherein the active energy ray-curable top coating composition (II) comprises a polymerizable unsaturated compound (C) in an amount of 0.1 to 1,000 parts by mass per 100 parts by mass of nonvolatile matter of a silsesquioxane compound (a).

6. The method according to claim 1, wherein the undercoating composition (I) is an active energy ray-curable undercoating composition (Ia) comprising a photoinitiator, a UV absorber, a light stabilizer, and a polymerizable unsaturated compound comprising urethane(meth)acrylate having two or more (meth)acryloyl groups per molecule.

7. The method according to claim 6, wherein
the active energy ray-curable undercoating composition (Ia) comprises a polymerizable unsaturated compound in an amount of 30 to 97 parts by mass per 100 parts by mass of nonvolatile matter of the coating composition, a photoinitiator in an amount of 0.1 to 10 parts by mass per 100 parts by mass of nonvolatile matter of the polymerizable unsaturated compound, and a UV absorber in an amount of 0.5 to 20 parts by mass per 100 parts by mass of nonvolatile matter of the polymerizable unsaturated compound.

8. The method according to claim 6, wherein the polymerizable unsaturated compound comprises urethane(meth)acrylate in an amount of 30 to 100 parts by mass per 100 parts by mass of nonvolatile matter of the polymerizable unsaturated compound.

9. The method according to claim 1, wherein the undercoating composition (I) is a photo- and heat-curable undercoating composition (Ib) comprising a polymerizable unsaturated compound, a hydroxy-containing resin, a photoinitiator, a UV absorber, and a light stabilizer.

10. The method according to claim 9, wherein the photo- and heat-curable undercoating composition (Ib) comprises a polymerizable unsaturated compound in an amount of 10 to 80 parts by mass per 100 parts by mass of nonvolatile matter of the coating composition, a hydroxy-containing resin in an amount of 10 to 80 parts by mass per 100 parts by mass of nonvolatile matter of the coating composition, a photoinitiator in an amount of 1 to 20 parts by mass per 100 parts by mass of nonvolatile matter of the polymerizable unsaturated compound, a UV absorber in an amount of 0.5 to 20 parts by mass per 100 parts by mass of nonvolatile matter of the coating composition, and a light stabilizer in an amount of 0.1 to 10 parts by mass per 100 parts by mass of nonvolatile matter of the coating composition.

11. The method according to claim 9, wherein the polymerizable unsaturated compound comprises an isocyanate-containing compound.

12. The method according to claim 11, wherein the isocyanate-containing compound is a radical polymerizable unsaturated group-containing compound having an isocyanate equivalent amount of 300 to 3,800.

13. The method according to claim 1, wherein the undercoating composition (I) is a room temperature- or heat-curable undercoating composition (Ic) comprising an acrylic resin, a UV absorber, and a light stabilizer.

14. The method according to claim 13, wherein the room temperature- and heat-curable undercoating composition (Ic) comprises an acrylic resin in an amount of 50 to 99.4 parts by mass per 100 parts by mass of nonvolatile matter of the coating composition, a UV absorber in an amount of 0.5 to 20 parts by mass per 100 parts by mass of nonvolatile matter of the coating composition, and a light stabilizer in an amount of 0.1 to 10 parts by mass per 100 parts by mass of nonvolatile matter of the coating composition.

15. The method according to claim 1, wherein the undercoating composition (I) is a room temperature- or heat-curable undercoating composition (Ic)' comprising an acrylic resin obtained by copolymerizing a polymerizable unsaturated monomer mixture comprising a UV-absorbing polymerizable unsaturated monomer and/or a UV-stable polymerizable unsaturated monomer.

16. The method according to claim 15, wherein the room temperature- or heat-curable undercoating composition (Ic)' comprises an acrylic resin in an amount of 50 to 100 parts by mass per 100 parts by mass of nonvolatile matter of the coating composition.

17. The method according to claim 7, wherein the polymerizable unsaturated compound comprises urethane(meth)acrylate in an amount of 30 to 100 parts by mass per 100 parts by mass of nonvolatile matter of the polymerizable unsaturated compound.

* * * * *